US012380453B2

(12) United States Patent
Nishida et al.

(10) Patent No.: US 12,380,453 B2
(45) Date of Patent: Aug. 5, 2025

(54) CONTROLLING METHOD, DEVICE, AND RECORDING MEDIUM

(71) Applicant: Panasonic Intellectual Property Corporation of America, Torrance, CA (US)

(72) Inventors: Naohisa Nishida, Osaka (JP); Yuji Unagami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 33 days.

(21) Appl. No.: 17/738,419

(22) Filed: May 6, 2022

(65) Prior Publication Data

US 2022/0270102 A1 Aug. 25, 2022

Related U.S. Application Data

(63) Continuation of application No. PCT/JP2020/043283, filed on Nov. 19, 2020.
(Continued)

(51) Int. Cl.
*G06Q 40/00* (2023.01)
*G06Q 20/38* (2012.01)
*G06Q 20/40* (2012.01)

(52) U.S. Cl.
CPC ....... *G06Q 20/4016* (2013.01); *G06Q 20/389* (2013.01)

(58) Field of Classification Search
CPC .................. G06Q 20/4016; G06Q 20/389
See application file for complete search history.

(56) References Cited

U.S. PATENT DOCUMENTS

| 2018/0082390 A1* | 3/2018 | Leidner | G06Q 20/3674 |
| 2020/0175514 A1* | 6/2020 | Bier | G06F 16/1824 |

(Continued)

FOREIGN PATENT DOCUMENTS

| JP | 2002-163216 | 6/2002 |
| JP | 2010-262615 | 11/2010 |
| JP | 2016-99913 | 5/2016 |

OTHER PUBLICATIONS

Tironsakkul, T (Probing the mystery of cryptocurrency theft, an investigation into methods for cryptocurrency tainting analysis, Heriot-Watt University, https://papers.ssrn.com/sol3/papers.cfm?abstract_id=3403656, Jun. 2019) (Year: 2019).*

(Continued)

*Primary Examiner* — Mark H Gaw
(74) *Attorney, Agent, or Firm* — Wenderoth, Lind & Ponack, L.L.P.

(57) ABSTRACT

A controlling method is executed by one device among a plurality of devices each including a distributed ledger in an illicit transaction reporting system that reports an illicit transaction in electronic transactions, and the controlling method includes obtaining report transaction data that includes report information indicating a report that one transaction is suspected of being illicit, transferring the report transaction data obtained to other devices among the plurality of devices and storing the report transaction data into the distributed ledger of the one device, obtaining approving or disapproving transaction data that includes approving or disapproving information with regard to the report, transferring the approving or disapproving transaction data obtained to the other devices and storing the approving or disapproving transaction data into the distributed ledger of the one device, and determining whether the report is correct based on the approving or disapproving (Continued)

information in the approving or disapproving transaction data.

19 Claims, 16 Drawing Sheets

Related U.S. Application Data

(60) Provisional application No. 62/938,536, filed on Nov. 21, 2019.

(56) References Cited

U.S. PATENT DOCUMENTS

2020/0380520 A1* 12/2020 Kavali ............... G06Q 20/4016
2021/0279736 A1*  9/2021 Sun .................. G06Q 20/40975

OTHER PUBLICATIONS

International Search Report (ISR) issued on Jan. 26, 2021 in International (PCT) Application No. PCT/JP2020/043283.

* cited by examiner

CONTROLLING METHOD, DEVICE, AND RECORDING MEDIUM

CROSS REFERENCE TO RELATED APPLICATIONS

This is a continuation application of PCT International Application No. PCT/JP2020/043283 filed on Nov. 19, 2020, designating the United States of America, which is based on and claims priority of U.S. Provisional Patent Application No. 62/938,536 filed on Nov. 21, 2019. The entire disclosures of the above-identified applications, including the specifications, drawings and claims are incorporated herein by reference in their entirety.

FIELD

The present disclosure relates to a controlling method, a device, and a recording medium.

BACKGROUND

Nowadays, with the spread of electronic commerce, individuals engage in electronic commercial transactions. One problem is that such electronic commercial transactions may include an illicit transaction.

For example, Patent Literature (PTL) 1 discloses an illicit transaction detecting system. This illicit transaction detecting system analyzes transaction data, compares the analyzed transaction data against illicit transaction participant data stored in an illicit transaction participant database, and issues a warning if the illicit transaction detecting system detects items of data that partially match between the analyzed transaction data and the illicit transaction participant data.

CITATION LIST

Patent Literature

PTL 1: Japanese Unexamined Patent Application Publication No. 2016-99913

SUMMARY

Technical Problem

The method disclosed in PTL 1, however, requires at least a certain level of accuracy for the illicit transaction participant database in order to detect an illicit transaction, and this creates a problem of making it difficult to detect an illicit transaction appropriately.

The present disclosure has been made in view of such circumstances and is directed to providing a controlling method, a server, and a recording medium that each make it possible to detect an illicit transaction appropriately.

Solution to Problem

A controlling method according to one aspect of the present disclosure is a controlling method to be executed by one device among a plurality of devices each including a distributed ledger in an illicit transaction reporting system that reports an illicit transaction in electronic transactions, and the controlling method includes: obtaining report transaction data that includes report information indicating a report that one transaction is suspected of being illicit; transferring the report transaction data obtained to a plurality of other devices among the plurality of devices and storing the report transaction data into the distributed ledger of the one device; obtaining approving or disapproving transaction data that includes approving or disapproving information with regard to the report; transferring the approving or disapproving transaction data obtained to the plurality of other devices and storing the approving or disapproving transaction data into the distributed ledger of the one device; and determining whether the report is correct based on the approving or disapproving information included in the approving or disapproving transaction data.

It is to be noted that general or specific aspects of the above may be implemented in the form of a system, a method, an integrated circuit, a computer program, or a non-transitory recording medium, such as a computer readable CD-ROM, or through any desired combination of a system, a method, an integrated circuit, a computer program, and a non-transitory recording medium.

Advantageous Effects

The present disclosure makes it possible to detect an illicit transaction appropriately.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
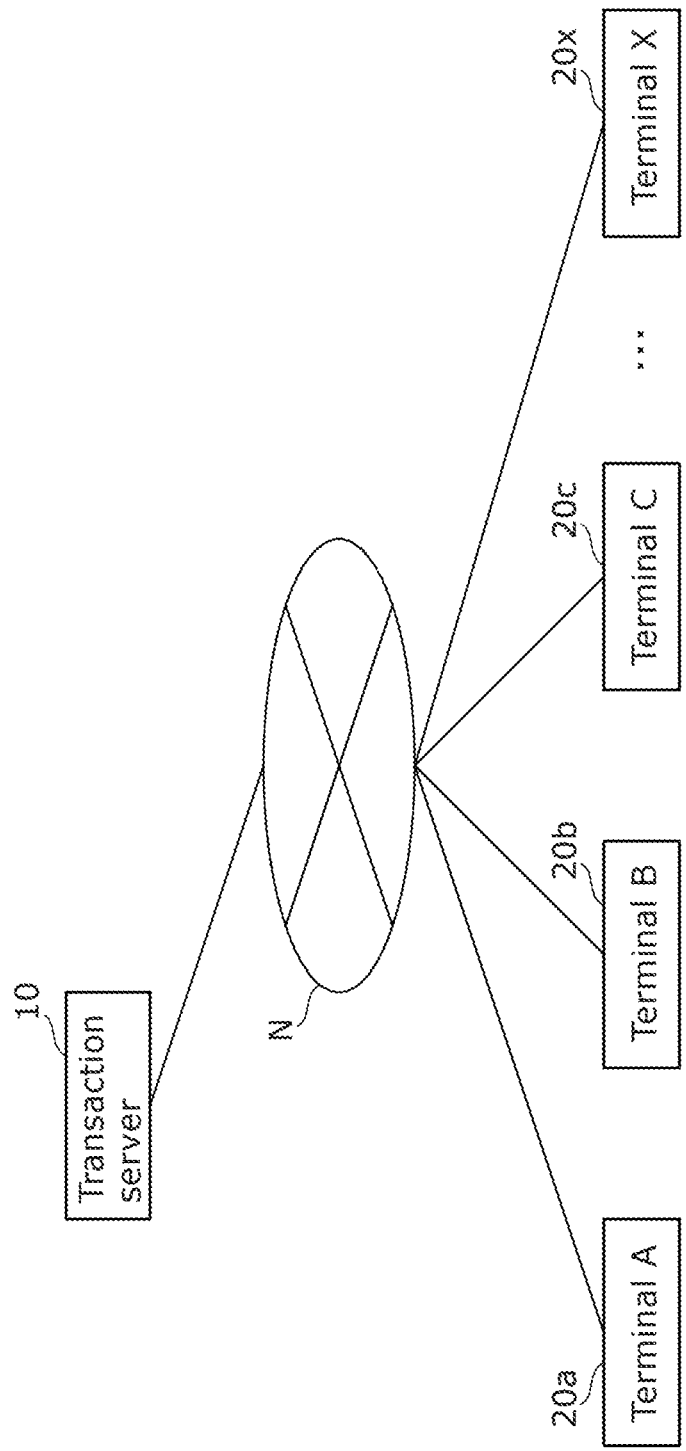
FIG. 1 is a diagram illustrating an example of a configuration of a managing system according to Embodiment 1.

A controlling method according to one aspect of the present disclosure is a controlling method to be executed by one device among a plurality of devices each including a distributed ledger in an illicit transaction reporting system that reports an illicit transaction in electronic transactions, and the controlling method includes obtaining report transaction data that includes report information indicating a report that one transaction is suspected of being illicit, transferring the report transaction data obtained to a plurality of other devices among the plurality of devices and storing the report transaction data into the distributed ledger of the one device, obtaining approving or disapproving transaction data that includes approving or disapproving information with regard to the report, transferring the approving or disapproving transaction data obtained to the plurality of other devices and storing the approving or disapproving transaction data into the distributed ledger of the one device, and determining whether the report is correct based on the approving or disapproving information included in the approving or disapproving transaction data.

This method makes it possible to determine whether a report is correct based on approving or disapproving information that is stored in a distributed ledger and is thus unlikely to be altered. This, therefore, makes it possible to detect an illicit transaction appropriately.

Moreover, the obtaining of the approving or disapproving transaction data may include obtaining items of approving or disapproving transaction data from a plurality of terminals owned respectively by a plurality of users, and the determining may include determining, based on the items of approving or disapproving information, that the report is correct when, of the items of approving or disapproving information, a total number of items of approving or disapproving information that is in favor of the report is greater than a predetermined threshold value or that the report is incorrect when the total number of the items of approving or disapproving information that is in favor of the report is smaller than the predetermined threshold value.

With this method, with use of a plurality of items of approving or disapproving information, a report is determined to be correct when the number of items of approving or disapproving information that is in favor of the report is greater than a predetermined threshold value, and a report is determined to be incorrect when the number of items of approving or disapproving information that is in favor of the report is smaller than the predetermined threshold value. This, therefore, makes it possible to detect an illicit transaction more appropriately.

The controlling method may further include transmitting first token transaction data to the plurality of other devices and storing the first token transaction data into the distributed ledger of the one device, and the first token transaction data may include a first token amount of a token to be provided to each of the plurality of users who have transmitted the items of approving or disapproving transaction data.

This method can provide a potential voter with an incentive to vote. This, therefore, can increase the number of voters and reduce the likelihood that the determination made on a report is biased. Accordingly, this method makes it possible to detect an illicit transaction more appropriately.

The controlling method may further include updating a first reliability of each of the plurality of users who have transmitted the items of approving or disapproving transaction data so as to raise the first reliability, transferring first reliability transaction data that includes the first reliability updated to the plurality of other devices, and storing the first reliability transaction data into the distributed ledger of the one device. Herein, the determining may include calculating the total number of the approving or disapproving information that is in favor of the report by use of a weight that is based on the first reliability.

With this method, the weight is set to a greater value as the reliability of the user is higher, and thus the likelihood that an illicit transaction is detected erroneously due to illicit votes can be reduced.

The controlling method may further include canceling the one transaction when the report is determined to be correct in the determining.

This method can reduce the likelihood that an illicit transaction is continued.

The controlling method may further include, when the report is determined to be correct in the determining, transmitting second token transaction data to the plurality of other devices and storing the second token transaction data into the distributed ledger of the one device, and the second token transaction data may include a second token amount of a token to be provided to a reporter that is a user who has transmitted the report transaction data.

This method can provide a potential reporter with an incentive to make a correct report. This, therefore, makes it possible to detect an illicit transaction more appropriately.

The controlling method may further include, when the report is determined to be incorrect in the determining, transmitting third token transaction data to the plurality of other devices and storing the third token transaction data into the distributed ledger of the one device, and the third token transaction data may include a third token amount of a token to be collected from a reporter that is a user who has transmitted the report transaction data.

This method can reduce the likelihood that a reporter makes an illicit report. This, therefore, makes it possible to detect an illicit transaction more appropriately.

The controlling method may further include, when the report is determined to be correct in the determining, updating a reliability of a reporter that is a user who has transmitted the report transaction data so as to raise the reliability, transferring reliability transaction data that includes the reliability updated to the plurality of other devices, and storing the reliability transaction data into the distributed ledger of the one device. Herein, the predetermined threshold value used in the determining may be set to a smaller value as the reliability updated of the reporter in the distributed ledger stored in the distributed ledger is greater.

This method can reduce the likelihood that any illicit report made by a reporter is determined to be correct. Accordingly, the likelihood of erroneously detecting an illicit transaction can be reduced.

The controlling method may further include obtaining application information that includes a fourth token amount for conducting a transaction from a terminal operated by an applicant of the transaction, returning a token in an amount equal to the fourth token amount to the applicant when no report is made with regard to the transaction or when the report made is determined to be incorrect, and refraining from returning a token in an amount equal to the fourth token amount to the applicant when the report is made with regard to the transaction and the report is determined to be correct.

This method can reduce the likelihood that a reporter makes a report with regard to a transaction that is not suspected of being illicit or a transaction that is unlikely to be illicit.

The fourth token amount may be set to an amount corresponding to a reliability set for the applicant.

The controlling method may further include obtaining execution transaction data that includes execution information for causing the determining to be executed. Herein, each of the distributed ledgers included in the plurality of devices may include a contract code for executing the determining based on the execution transaction data, and the determining may include, in response to obtaining the execution transaction data, executing the determining by executing the contract code included in the distributed ledger of the one device.

The approving or disapproving information included in the approving or disapproving transaction data may be encrypted, a decryption key for decrypting the approving or disapproving information encrypted may be obtained from a device or a terminal that has transmitted the approving or disapproving transaction data by transmitting request information requesting the decryption key to the device or the terminal, the approving or disapproving information encrypted may be decrypted with the decryption key, and whether the report is correct may be determined based on the approving or disapproving information decrypted.

The transmitting of the request information may include transmitting request transaction data that includes the request information to the plurality of other devices and storing the request transaction data into the distributed ledger of the one device, and the obtaining of the decryption key may include obtaining decryption key transaction data that includes the decryption key from the plurality of other devices and storing the decryption key transaction data into the distributed ledger of the one device.

A device according to one aspect of the present disclosure is one device among a plurality of devices each including a distributed ledger in an illicit transaction reporting system that reports an illicit transaction in electronic transactions, and the one device includes a processor and a memory. With use of the memory, the processor obtains report transaction data that includes report information indicating a report that a transaction is suspected of being illicit, transfers the report transaction data obtained to a plurality of other devices among the plurality of devices and stores the report transaction data into the distributed ledger of the one device, obtains approving or disapproving transaction data that includes approving or disapproving information with regard to the report, transfers the approving or disapproving transaction data obtained to the plurality of other devices and stores the approving or disapproving transaction data into the distributed ledger of the one device, and determines whether the report is correct based on the approving or disapproving information included in the approving or disapproving transaction data.

This configuration makes it possible to determine whether a report is correct based on approving or disapproving information that is stored in a distributed ledger and is thus unlikely to be altered. This, therefore, makes it possible to detect an illicit transaction appropriately.

A non-transitory computer readable recording medium according to one aspect of the present disclosure stores a program that causes a computer to execute a controlling method to be executed by one device among a plurality of devices each including a distributed ledger in an illicit transaction reporting system that reports an illicit transaction in electronic transactions, and the program causes a computer to execute obtaining report transaction data that includes report information indicating a report that one transaction is suspected of being illicit, transferring the report transaction data obtained to a plurality of other devices among the plurality of devices and storing the report transaction data into the distributed ledger of the one device, obtaining approving or disapproving transaction data that includes approving or disapproving information with regard to the report, transferring the approving or disapproving transaction data obtained to the plurality of other devices and storing the approving or disapproving transaction data into the distributed ledger of the one device, and determining whether the report is correct based on the approving or disapproving information included in the approving or disapproving transaction data.

This program makes it possible to determine whether a report is correct based on approving or disapproving information that is stored in a distributed ledger and is thus unlikely to be altered. This, therefore, makes it possible to detect an illicit transaction appropriately.

Hereinafter, some exemplary embodiments will be described with reference to the drawings. It is to be noted that the exemplary embodiments described hereinafter merely illustrate specific examples of the present disclosure. In other words, the numerical values, the shapes, the materials, the constituent elements, the arrangement and the connection modes of the constituent elements, the steps, the order of the steps, and so on illustrated in the following exemplary embodiments are examples and are not intended to limit the present disclosure. Moreover, among the constituent elements in the following exemplary embodiments, any constituent element that is not included in independent claims expressing the broadest concept is not necessarily required in order to solve the problem faced by the present disclosure but is construed as a constituent element forming a more preferable embodiment.

Embodiment 1

First, a system configuration according to the present disclosure will be described.

A managing system according to the present disclosure includes three or more terminals to be used by respective users as well as one or more authentication servers. The managing system allows auditing of a newly entered contract, that is, auditing of the content of the contract and stores a contract validated as the result of the audit. Hereinafter, a configuration and so on of the managing system according to the present embodiment will be described with reference to the drawings.

[Managing System]

FIG. 1 is a diagram illustrating an example of a configuration of a managing system according to Embodiment 1.

As illustrated in FIG. 1, the managing system according to the present embodiment includes, for example, transaction server 10 and terminals 20a to 20x. These components are connected to each other via network N. Network N is, for example but not limited to, the internet or a mobile phone carrier network. Network N may be formed by any communication circuit or network.

In the following description, terminal 20a to terminal 20x may each be referred to also as terminal 20. Alternatively, terminal 20a to terminal 20x may be referred to also as terminal A to terminal X, respectively.

Now, transaction server 10 will be described.

[Transaction Server 10]

Transaction server 10 is an example of one device among a plurality of devices each including a distributed ledger. Transaction server 10 is a server managed by a transaction service provider. A transaction service provider is, for example, a service provider that provides an electronic commerce service to a plurality of users. An electronic commerce service may include, for example, a service for a transaction between a business entity and an individual or a service for a transaction between individuals. In other words, an electronic commerce service may include a service for a transaction between a plurality of users. A transaction in an electronic commerce service may be a transaction in which users exchange an article and a token or a transaction in which users exchange a service and a token.

Figure 2:
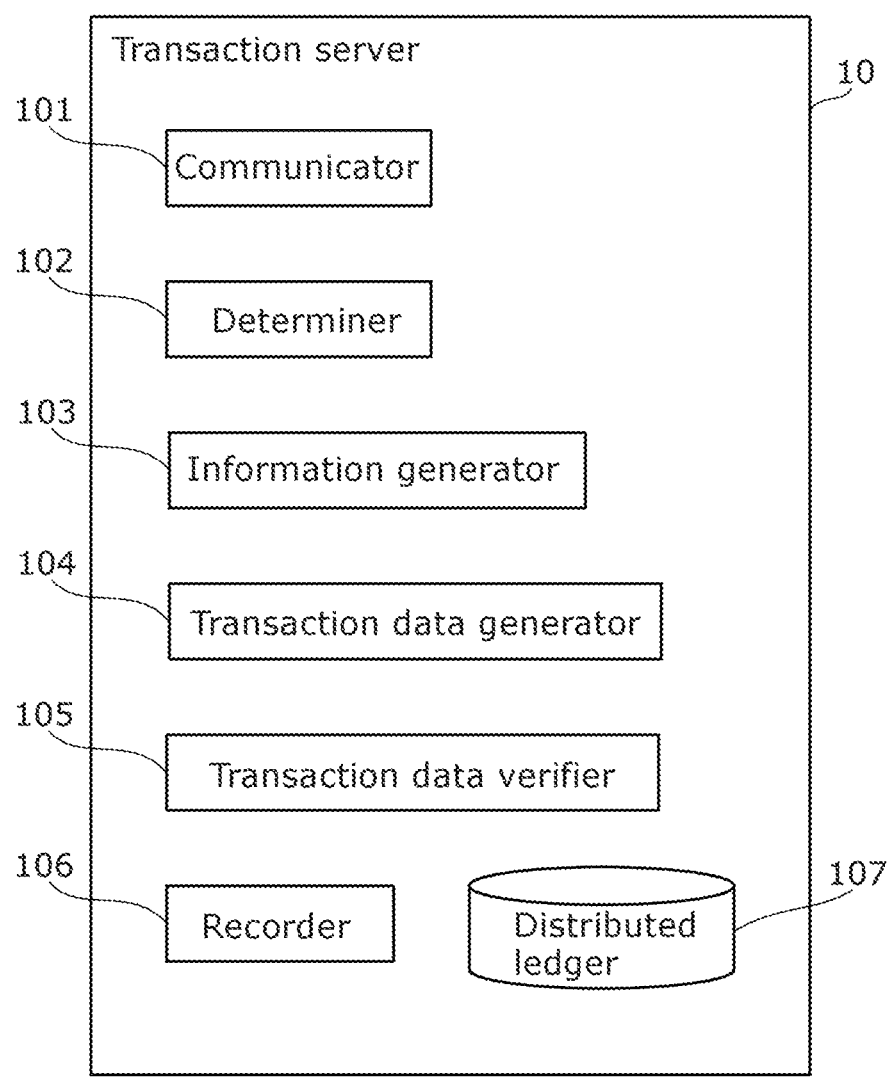
FIG. 2 is a diagram illustrating an example of a configuration of a transaction server according to Embodiment 1.

FIG. 2 is a diagram illustrating an example of a configuration of transaction server 10 according to Embodiment 1.

As illustrated in FIG. 2, transaction server 10 includes communicator 101, determiner 102, information generator 103, transaction data generator 104, transaction data verifier 105, recorder 106, and distributed ledger 107. Transaction server 10 may be implemented as a processor executes a predetermined program with use of a memory. Now, each of the constituent elements will be described.

<Communicator 101>

Communicator 101 receives report transaction data that includes report information from terminal 20. Communicator 101 obtains report information by receiving report transaction data from terminal 20. Report information is information indicating a report concerning a transaction suspected of being illicit. Report information includes, for example, transaction identification information and illicitness information indicating that the transaction identified by the transaction identification information is suspected of being illicit. The report information may further include user identification information that identifies the user who has made the report. The user identification information may be an electronic signature of the user who has made the report. The illicitness information may indicate not only the fact that the transaction of interest is suspected of being illicit but also the content of the illicitness. The content of the illicitness may indicate, for example but not limited to, that the actual article or service in the transaction of interest is different from the article or the service indicated as the subject of the transaction or that the price set for the article or the service in the transaction of interest deviates from its standard price. That the price of an item deviates from its standard price means, for example, that the difference between the set price and the standard price is greater than the value in price corresponding to a predetermined percentage of the standard price. A standard price may be calculated based on an actual record in which an article or a service that is the same as, of the same type as, or equivalent to the article or the service was sold in the past.

Transaction identification information is information that identifies a transaction conducted in the transaction service. Transaction identification information may be, for example, a transaction ID or a combination of a user ID of a user who provides an article or a service to be exchanged in the transaction and a serial number of the article or the service provided by this user. Communicator 101 may receive report information directly from terminal 20.

Communicator 101 further receives approving or disapproving transaction data that includes approving or disapproving information from terminal 20. Communicator 101 receives a plurality of items of approving or disapproving transaction data from respective terminals 20. In other words, communicator 101 obtains a plurality of items of approving or disapproving transaction data by receiving an item of approving or disapproving transaction data from each terminal 20. Approving or disapproving information is information that indicates whether a user is in favor of or against a report, that is, information that indicates whether the user is in favor of or opposes the report. Approving or disapproving information includes information that indicates whether the user of given terminal 20 is in favor of or against a report. Approving or disapproving information includes, for example, report identification information that identifies report information indicating a report in favor or or against which a user is voting and information that indicates whether the user is in favor of or against the report. The approving or disapproving information may further include user identification information that identifies the user who has determined to vote in favor of or against the report. The user identification information may be an electronic signature of the user who has determined to vote in favor of or against the report. Approving or disapproving information may also indicate that the user's determination is unclear, aside from that the user is in favor of or against a report.

Approving or disapproving information may be encrypted. The approving or disapproving information may be encrypted by, for example, a private key held by terminal 20 that has transmitted the approving or disapproving transaction data that includes this approving or disapproving information. Communicator 101 may receive approving or disapproving information directly from each of the plurality of terminals 20.

Moreover, communicator 101 transmits request transaction data that includes request information to each of the plurality of terminals 20. Request information is information for requesting a decryption key for decrypting encrypted approving or disapproving information from each of the plurality of terminals 20 that have each transmitted approving or disapproving transaction data that includes the encrypted approving or disapproving information. The decryption key to be requested may be, for example, a public key that is paired with a private key held by terminal 20. Communicator 101 may transmit request information directly to each terminal 20.

Moreover, communicator 101 receives decryption key transaction data that includes a decryption key. Specifically, communicator 101 obtains a decryption key from each of the plurality of terminals 20 by transmitting request transaction data that includes request information to each of the plurality of terminals 20. Communicator 101 may receive a decryption key directly from each of the plurality of terminals 20.

Moreover, communicator 101 transmits first token transaction data that includes a first token amount to each of the plurality of terminals 20. The first token amount indicates the amount of a token to be provided to each of a plurality of voters who are each a user who has transmitted an item of approving or disapproving transaction data. In other words, the first token amount indicates the amount of a token to be provided to each of the plurality of voters. In this example, in a case where there is only one user who has transmitted approving or disapproving transaction data, the first token amount indicates the amount of a token to be provided to this one voter.

Moreover, communicator 101 transmits second token transaction data that includes a second token amount to each of the plurality of terminals 20. The second token amount indicates the amount of a token to be provided to a reporter who is a user who has transmitted report transaction data. In other words, the second token amount indicates the amount of a token to be provided to the reporter.

Moreover, communicator 101 transmits third token transaction data that includes a third token amount to each of the plurality of terminals 20. The third token amount indicates the amount of a token to be collected from a reporter who is a user who has transmitted report transaction data. In other words, the third token amount indicates the amount of a token to be received from the reporter.

Moreover, communicator 101 transmits or receives an item or items of transaction data to or from each of the plurality of terminals 20. Specifically, communicator 101, for example, transfers an item of transaction data to the plurality of terminals 20 or receives an item of transaction data transferred from the plurality of terminals 20. In this example, such transaction data includes one of report transaction data, approving or disapproving transaction data, request transaction data, decryption key transaction data, first token transaction data, second token transaction data, or third token transaction data.

In this manner, communicator 101 communicates with each of the plurality of terminals 20 via network N. This communication may be carried out through the transport layer security (TLS), and an encryption key for the TLS communication may be held in communicator 101.

<Determiner 102>

Determiner 102 determines whether a report indicated by report information included in report transaction data obtained by communicator 101 is correct based on approving or disapproving information included in approving or disapproving transaction data obtained by communicator 101. Specifically, based on a plurality of items of approving or disapproving information included in respective items of approving or disapproving transaction data obtained by communicator 101, determiner 102 determines that the report is correct if, among the plurality of items of approving or disapproving information, the number of items of approving or disapproving information that indicates that the user has voted in favor of the report is greater than a predetermined threshold value or determines that the report is incorrect if the number of items of approving or disapproving information that indicates that the user has voted in favor of the report is smaller than the predetermined threshold value. In other words, transaction server 10 collects a plurality of items of approving or disapproving information from respective terminals 20 to receive their votes in favor of or against the report from the plurality of users. Then, transaction server 10 determines that the report is correct if the number of votes in favor of the report in the voting result is greater than the predetermined threshold value or determines that the report is incorrect if the number of votes in favor of the report is smaller than the predetermined threshold value. In this example, if the number of votes in favor of the report is equal to the predetermined threshold value, transaction server 10 may determine that the report is correct, that the report is incorrect, or that the result is unclear.

The predetermined threshold value may be, for example, the majority calculated based on the number of items of approving or disapproving transaction data obtained by communicator 101 or the number of items of approving or disapproving information. In another example, the predetermined threshold value may be the number calculated by multiplying the number of items of approving or disapproving transaction data or the number of items of approving or disapproving information by a predetermined percentage. The predetermined percentage may be, for example, a fixed value within the range of from 40% to 60% or a variable value that is within the range of from 40% to 60% and that varies in accordance with a predetermined condition.

<Information Generator 103>

Information generator 103 generates, for example, request information. Moreover, information generator 103 generates, for example, the first token amount. Moreover, information generator 103 generates, for example, the second token amount. Moreover, information generator 103 generates, for example, the third token amount. The request information, the first token amount, the second token amount, and the third token amount have been described above in detail, and thus their description will be omitted here.

<Transaction Data Generator 104>

Transaction data generator 104 generates request transaction data. According to the present embodiment, transaction data generator 104 generates request transaction data that includes request information generated by information generator 103.

Moreover, transaction data generator 104 generates first token transaction data. According to the present embodiment, transaction data generator 104 generates first token transaction data that includes the first token amount generated by information generator 103. The first token transaction data may include, in addition to the first token amount, user identification information that identifies a user serving as a voter.

Moreover, transaction data generator 104 generates second token transaction data. According to the present embodiment, transaction data generator 104 generates second token transaction data that includes the second token amount generated by information generator 103. The second token transaction data may include, in addition to the second token amount, user identification information that identifies a user serving as a reporter.

Moreover, transaction data generator 104 generates third token transaction data. According to the present embodiment, transaction data generator 104 generates third token transaction data that includes the third token amount generated by information generator 103. The third token transaction data may include, in addition to the third token amount, user identification information that identifies a user serving as a reporter.

Transaction data generator 104 transmits generated request transaction data to each of the plurality of terminals 20 via communicator 101. Moreover, transaction data generator 104 transmits generated first token transaction data to each of the plurality of terminals 20 via communicator 101. Moreover, transaction data generator 104 transmits generated second token transaction data to each of the plurality of terminals 20 via communicator 101. Moreover, transaction data generator 104 transmits generated third token transaction data to each of the plurality of terminals 20 via communicator 101.

<Transaction Data Verifier 105>

Transaction data verifier 105 verifies the legitimacy of transaction data in response to communicator 101 receiving the transaction data. Transaction data verifier 105 checks, for example but not limited to, whether an electronic signature generated with a proper technique is appended to the transaction data that communicator 101 has received. In this example, this verification may be skipped. In this example, the transaction data that communicator 101 receives is any one of report transaction data, approving or disapproving transaction data, request transaction data, decryption key transaction data, first token transaction data, second token transaction data, or third token transaction data.

Moreover, transaction data verifier 105, together with the plurality of terminals 20, executes a consensus algorithm for establishing consensus with regard to the legitimacy of transaction data.

In this example, for the consensus algorithm, a Practical Byzantine Fault Tolerance (PBFT) algorithm or any other known consensus algorithms may be used. Examples of known consensus algorithms include the proof of work (PoW) algorithm or the proof of stake (PoS) algorithm. In a case where the PBFT algorithm is used for the consensus algorithm, transaction data verifier 105 receives information from each of the plurality of terminals 20 as to whether the transaction data has been verified successfully and determines whether the number of items of such information has exceeded a predetermined number. Then, when the number of items of such information has exceeded the predetermined number, transaction data verifier 105 may determine that the legitimacy of the transaction data has been verified through the consensus algorithm.

In response to confirming the legitimacy of the transaction data, transaction data verifier 105 causes recorder 106 to record this transaction data.

According to the present embodiment, transaction data verifier 105 verifies the legitimacy of report transaction data, approving or disapproving transaction data, request transaction data, decryption key transaction data, first token transaction data, second token transaction data, or third token transaction data that communicator 101 receives.

<Recorder 106>

Recorder 106 records transaction data of which the legitimacy has been verified by transaction data verifier 105 by storing the transaction data into distributed ledger 107 with the transaction data incorporated in a block.

In this example, recorder 106 may include distributed ledger 107 therein.

<Distributed Ledger 107>

Distributed ledger 107 stores report transaction data that includes transaction information and report information, approving or disapproving transaction data that includes report information and approving or disapproving information, request transaction data that includes request information, decryption key transaction data that includes a decryption key, first token transaction data that includes the first token amount, second token transaction data that includes the second token amount, or third token transaction data that includes the third token amount.

Next, terminal 20a to terminal 20x will be described. In this example, terminal 20a to terminal 20x have a common configuration, and thus the term terminal 20 will be used in the following description.

[Terminal 20]

Terminal 20 is an example of a terminal used by a user. Terminal 20 may be, for example, a personal computer or a mobile terminal, such as a smartphone or a tablet. The plurality of terminals 20 are terminals used by respective users who use the electronic commerce service provided by transaction server 10. The plurality of users include, for example, a first user who provides an article or a service serving as a subject of a transaction and a second user who enters into the transaction of the article or the service provided by the first user. The first user is, for example, the seller of the article or the service, and the second user is, for example, the buyer of the article or the service.

Figure 3:
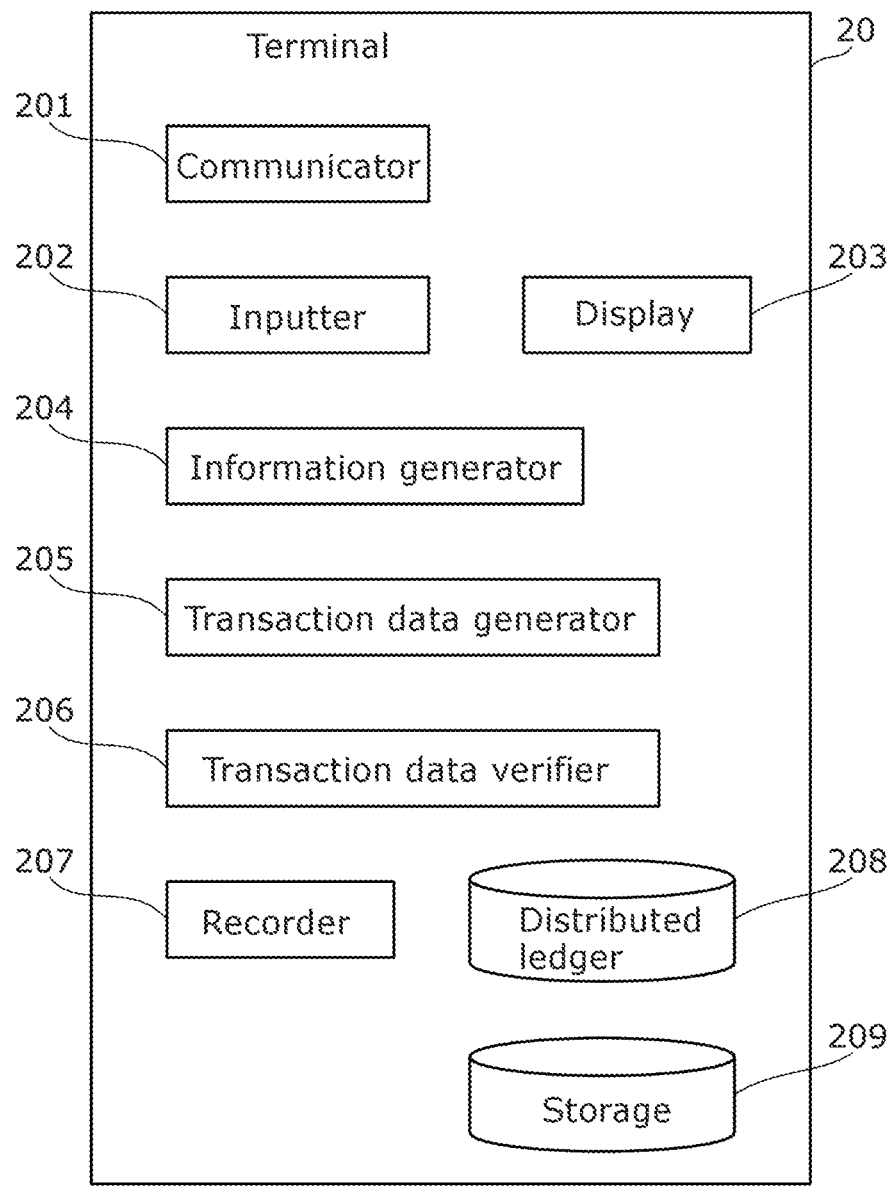
FIG. 3 is a diagram illustrating an example of a configuration of a terminal according to Embodiment 1.

FIG. 3 is a diagram illustrating an example of a configuration of terminal 20 according to Embodiment 1.

Terminal 20 according to the present embodiment includes communicator 201, inputter 202, display 203, information generator 204, transaction data generator 205, transaction data verifier 206, recorder 207, distributed ledger 208, and storage 209.

<Communicator 201>

Communicator 201 transmits information to transaction server 10 or another terminal 20 via network N or receives or is notified of information from transaction server 10 or another terminal 20. Information to be exchanged includes various items of transaction data.

In this manner, communicator 201 communicates with transaction server 10 or another terminal 20 via network N. This communication may be carried out through the transport layer security (TLS), and an encryption key for the TLS communication may be held in communicator 201.

<Inputter 202>

Inputter 202 receives an input of information through a user operation. Inputter 202, for example, displays received information on display 203, transmits received information to information generator 204, or transmits received information to communicator 201.

For example, inputter 202 may receive, as a report, an input indicating that a transaction being provided by transaction server 10 is suspected of being illicit. Inputter 202 may receive, along with the report, an electronic signature of the user via a display (a user interface (UI)) showing the transaction. Inputter 202 transmits the received report and the electronic signature of the user to information generator 204.

For example, inputter 202 receives, as the result indicating whether the user is in favor of or against a report, an input provided into a display (UI) for checking whether the user of terminal 20 is in favor of or against the report indicated by report information. This display (UI) is displayed on display 203. Inputter 202 may receive an electronic signature of the user. Inputter 202 transmits the received result indicating whether the user is in favor of or against the report and the electronic signature of the user to information generator 204.

<Display 203>

Display 203 displays an input of information received via inputter 202. Display 203 displays information transmitted from transaction server 10.

For example, display 203 may display a display (a user interface (UI)) showing a transaction. Moreover, for example, display 203 displays a display (UI) for checking whether the user of terminal 20 is in favor of or against a report indicated by report information.

<Information Generator 204>

Information generator 204 generates, for example, report information. Moreover, information generator 204 generates, for example, approving or disapproving information. Information generator 204 may encrypt the approving or disapproving information. Information generator 204 may encrypt the approving or disapproving information by use of, for example, a private key of terminal 20 stored in storage 209. The report information and the approving or disapproving information have been described above in detail, and thus their description will be omitted here.

<Transaction Data Generator 205>

Transaction data generator 205 generates report transaction data. According to the present embodiment, transaction data generator 205 generates report transaction data that includes report information generated by information generator 204.

Moreover, transaction data generator 205 generates approving or disapproving transaction data. According to the present embodiment, transaction data generator 205 generates approving or disapproving transaction data that includes approving or disapproving information generated by information generator 204.

Moreover, transaction data generator 205 generates decryption key transaction data. According to the present embodiment, transaction data generator 205 generates decryption key transaction data that includes a decryption key of terminal 20 stored in storage 209. The decryption key transaction data may include, in addition to the decryption key, user identification information that identifies the user of terminal 20. The user identification information may be an electronic signature of the user of terminal 20. The decryption key is, for example, a public key that is paired with a private key stored in terminal 20.

Transaction data generator 205 transmits generated report transaction data to transaction server 10 via communicator 201. Moreover, transaction data generator 205 transmits generated approving or disapproving transaction data to transaction server 10 via communicator 201.

<Transaction Data Verifier 206>

Transaction data verifier 206 verifies the legitimacy of transaction data in response to communicator 201 receiving the transaction data. In this example, this verification may be skipped.

Moreover, transaction data verifier 206, together with another terminal 20 and transaction server 10, executes a consensus algorithm for establishing consensus with regard to the legitimacy of transaction data. In response to confirming the legitimacy of transaction data, transaction data verifier 206 causes recorder 207 to record this transaction data.

According to the present embodiment, transaction data verifier 206 verifies the legitimacy of report transaction data, approving or disapproving transaction data, request transaction data, decryption key transaction data, first token transaction data, second token transaction data, or third token transaction data that communicator 201 receives.

Moreover, transaction data verifier 206 executes a consensus algorithm for establishing consensus with regard to the legitimacy of each item of transaction data. Then, in response to confirming the legitimacy of each item of transaction data, transaction data verifier 206 causes recorder 207 to record the item of transaction data.

<Recorder 207>

Recorder 207 records transaction data of which the legitimacy has been verified by transaction data verifier 206 by recording the transaction data into distributed ledger 208 with the transaction data incorporated in a block.

In this example, recorder 207 may include distributed ledger 208 therein.

<Distributed Ledger 208>

Distributed ledger 208 stores report transaction data that includes transaction information and report information, approving or disapproving transaction data that includes report information and approving or disapproving information, request transaction data that includes request information, decryption key transaction data that includes a decryption key, first token transaction data that includes the first token amount, second token transaction data that includes the second token amount, or third token transaction data that includes the third token amount.

<Storage 209>

Storage 209 stores an encryption key for encrypting terminal 20 and a decryption key for decrypting data encrypted by the encryption key. The encryption key and the decryption key are paired with each other. The encryption key is, for example, a private key, and the decryption key is, for example, a public key.

[Operation and Others of Managing System]

Next, an operation of the managing system configured as described above will be described.

Figure 4:
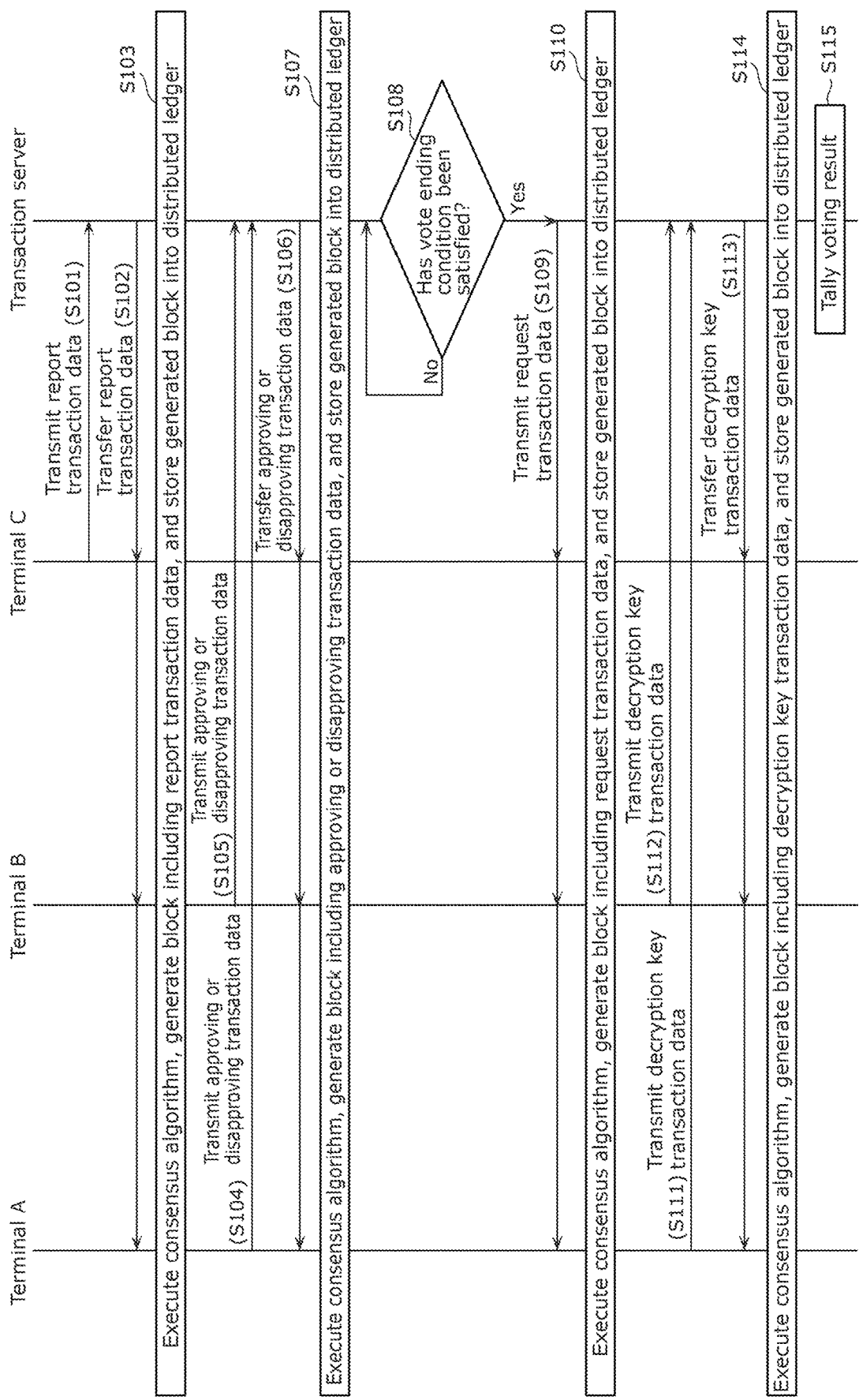
FIG. 4 is a sequence diagram illustrating a first example of an illicit transaction detecting process performed by the managing system according to Embodiment 1.
Figure 5:
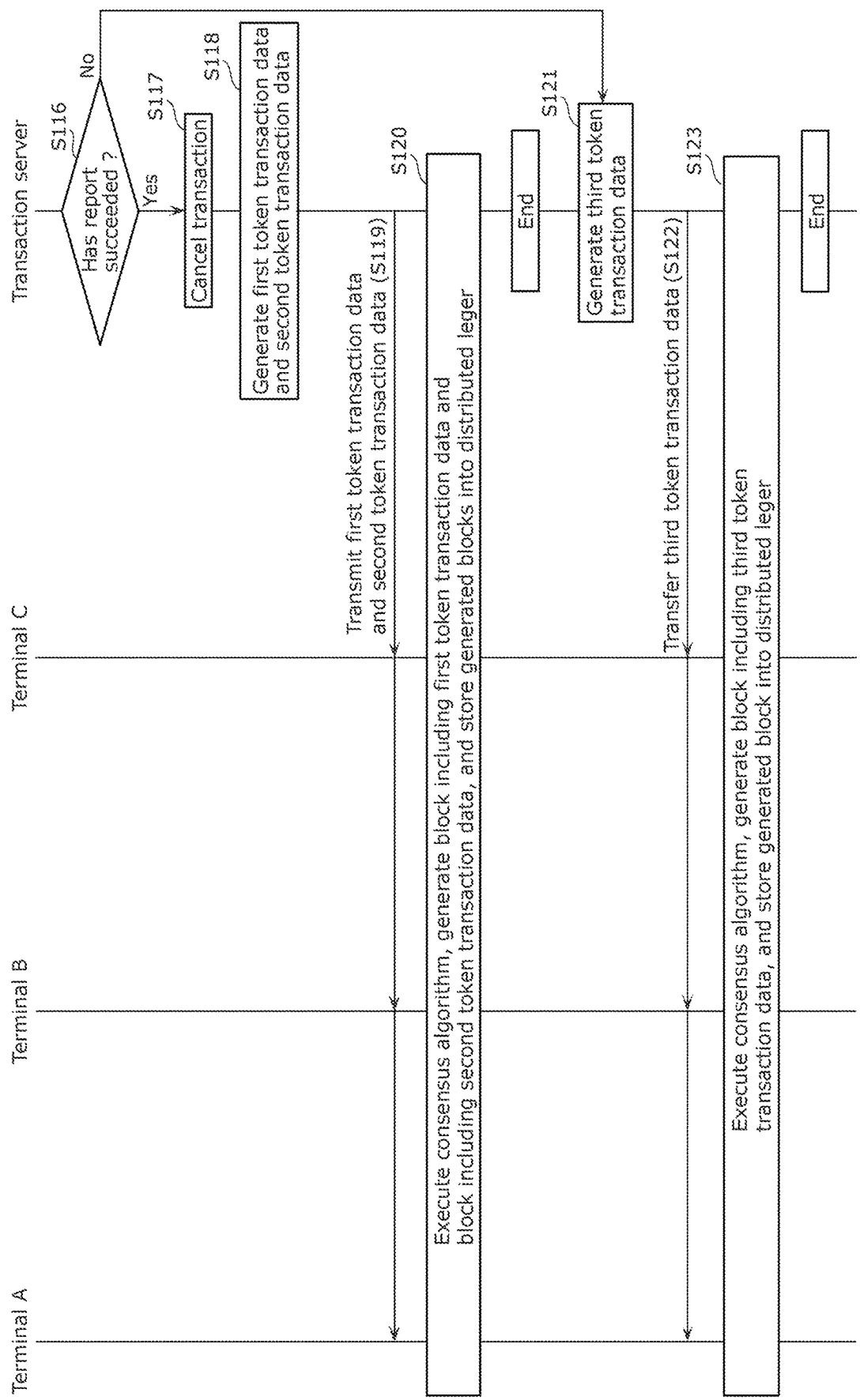
FIG. 5 is a sequence diagram illustrating the first example of the illicit transaction detecting process performed by the managing system according to Embodiment 1.

FIG. 4 and FIG. 5 show a sequence diagram illustrating a first example of an illicit transaction detecting process performed by the managing system according to Embodiment 1. FIG. 5 shows the process continued from the process shown in FIG. 4.

Terminal A, terminal B, and terminal C shown in FIG. 4 and FIG. 5 are terminals 20 operated by, respectively, user A, user B, and user C. In other words, terminal A, terminal B, and terminal C are included in the plurality of terminals 20. Terminal A is a terminal authenticated into an electronic commerce service provided by transaction server 10 with use of the user ID of user A. Terminal B is a terminal authenticated into the electronic commerce service provided by transaction server 10 with use of the user ID of user B. Terminal C is a terminal authenticated into the electronic commerce service provided by transaction server 10 with use of the user ID of user C.

First, by using terminal C, user C of terminal C provides an input indicating that a transaction among a plurality of transactions conducted in the electronic commerce service is suspected of being illicit. In other words, user C is the reporter who has provided the report. Meanwhile, user A and user B are voters who vote to indicate whether they are in favor of or against the report.

Terminal C transmits, to transaction server 10, report transaction data that includes report information generated based on the input (S101).

Next, transaction server 10 transfers the report transaction data received from terminal C to each of the plurality of terminals 20 including terminal C (S102).

Next, transaction server 10 and the plurality of terminals 20 execute a consensus algorithm, generate a block that includes the report transaction data, and store the generated block into corresponding distributed ledger 107 or 208 (S103).

Next, terminal A and terminal B each generate approving or disapproving transaction data and transmit the generated approving or disapproving transaction data to transaction server 10 (S104, S105). Specifically, after step S103, terminal A displays a display (UI) for checking whether user A is in favor of or against the report indicated by the report information included in the report transaction data and thus prompts user A to provide an input as to whether user A is in favor of or against the report. Then, in response to receiving an input from user A as to whether user A is in favor of or against the report, terminal A generates approving or disapproving information and generates approving or disapproving transaction data that includes the generated approving or disapproving information. In this example, a similar process is performed in terminal B as well, and thus terminal B also generates approving or disapproving transaction data.

Next, transaction server 10 transfers the approving or disapproving transaction data received from terminal A and the approving or disapproving transaction data received from terminal B to each of the plurality of terminals 20 including terminal A and terminal B (S106).

Next, transaction server 10 and the plurality of terminals 20 execute a consensus algorithm, generate a block that includes the approving or disapproving transaction data, and store the generated block into corresponding distributed ledger 107 or 208 (S107). In this example, at step S107, transaction server 10 may process the approving or disapproving transaction data received from terminal A and the approving or disapproving transaction data received from terminal B in batch or separately.

Next, transaction server 10 determines whether a vote ending condition has been satisfied (S108). The vote ending condition is that the voting deadline has passed, and this voting deadline is set based on the date and time at which the report has been made and is set past this date and time. Specifically, the voting deadline is set to the date and time that is a predetermined period past the date and time at which the report has been made. The voting deadline may be indicated in the form of the predetermined period or in the form of the date and time the predetermined period past the date and time at which the report has been made. The date and time at which the report has been made may be, for example, the date and time at which the report information has been generated or the date and time at which transaction server 10 has received the report transaction data. Alternatively, the vote ending condition is that the number of items of report transaction data that transaction server 10 has received has reached a predetermined number. The predetermined number may be a number indicated by a predetermined percentage of the number of the users other than the reporter.

If transaction server 10 has determined that the vote ending condition has been satisfied (Yes at S108), transaction server 10 executes the subsequent process at step S109. Meanwhile, if transaction server 10 has determined that the vote ending condition has not been satisfied (No at S108), transaction server 10 waits to receive or transfer the approving or disapproving transaction data from terminal A and terminal B and waits to execute the consensus algorithm.

At step S109, transaction server 10 generates request transaction data and transmits the generated request transaction data to each of the plurality of terminals 20 (S109).

Next, transaction server 10 and the plurality of terminals 20 execute a consensus algorithm, generate a block that includes the request transaction data, and store the generated block into corresponding distributed ledger 107 or 208 (S110).

Next, terminal A and terminal B each generate decryption key transaction data and transmit the generated decryption key transaction data to transaction server 10 (S111, S112). Specifically, after step S110, terminal A generates decryption key transaction data that includes a decryption key stored in storage 209 in response to the request information included in the request transaction data. In this example, a similar process is performed in terminal B as well, and thus terminal B also generates decryption key transaction data.

Next, transaction server 10 transfers the decryption key transaction data received from terminal A and the decryption key transaction data received from terminal B to each of the plurality of terminals 20 including terminal A and terminal B (S113).

Next, transaction server 10 and the plurality of terminals 20 execute a consensus algorithm, generates a block that includes the decryption key transaction data, and stores the generated block into corresponding distributed ledger 107 or 208 (S114).

Next, transaction server 10 tallies the voting result by use of the approving or disapproving transaction data and the decryption key transaction data obtained from each of terminal A and terminal B (S115). Specifically, by using the decryption key included in the decryption key transaction data obtained from each terminal 20, transaction server 10 decrypts the encrypted approving or disapproving information included in the approving or disapproving transaction data obtained from corresponding terminal 20. For example, if the decrypted approving or disapproving information indicates that the user is in favor of the report, transaction server 10 adds one to the count value of approving votes. Meanwhile, for example, if the decrypted approving or disapproving information indicates that the user is against the report, transaction server 10 may add one to the count value of disapproving votes. Transaction server 10 iteratively performs the process described above on each of the received plurality of items of approving or disapproving transaction data and thus counts the number of approving votes (or the number of disapproving votes). In other words, the number of approving votes is the number of items of approving or disapproving information indicating that the user is in favor of the report, among the plurality of items of approving or disapproving information included in the plurality of items of approving or disapproving transaction data that transaction server 10 has received. In this manner, transaction server 10 tallies the voting result by counting the number of approving votes (or the number of disapproving votes).

Next, transaction server 10 determines whether the report has succeeded (S116). Specifically, transaction server 10 determines that the report has succeeded if the number of approving votes (i.e., the number of items of approving or disapproving information indicating that the user is in favor of the report) is greater than a predetermined threshold value or determines that the report has failed if the number of approving votes is smaller than the predetermined threshold value. That the report has succeeded can be rephrased as that the report is correct, and that the report has failed can be rephrased as that the report is incorrect.

If transaction server 10 has determined that the report has succeeded (Yes at S116), transaction server 10 cancels the reported transaction (S117). Specifically, transaction server 10 may cancel the transaction by setting a flag indicating that the reported transaction has been canceled to ON, that is, by changing the value of the flag from the value indicating that the transaction is ongoing to the value indicating that the transaction has been canceled. Upon the transaction having been canceled, transaction server 10 may provide a display indicating that the corresponding transaction is on hold in the electronic commerce service or may change the status of the transaction to the one where no input can be accepted from the users in the electronic commerce service.

Next, transaction server 10 generates first token transaction data and second token transaction data (S118).

Next, transaction server 10 transmits the generated first token transaction data and the generated second token transaction data to each of the plurality of terminals 20 (S119).

Next, transaction server 10 and the plurality of terminals 20 execute a consensus algorithm, generate a block that includes the first token transaction data and a block that includes the second token transaction data, and store the generated blocks into corresponding distributed ledger 107 or 208 (S120). With this operation, in transaction server 10, the process of providing each voter with a token in the first token amount is executed, and the process of providing the reporter with a token in the second token amount is executed. Transaction server 10 may notify terminal 20 of each voter that the voter has been provided with a token in the first token amount. Moreover, transaction server 10 may notify terminal 20 of the reporter that the reporter has been provided with a token in the second token amount.

In this example, at step S118, transaction server 10 may generate token transaction data that includes the first token amount and the second token amount. At step S119, transaction server 10 may transmit the generated token transaction data to each of the plurality of terminals 20. Then, at step S120, transaction server 10 and the plurality of terminals 20 may execute a consensus algorithm, generate a block that includes the token transaction data, and store the generated block into corresponding distributed ledger 107 or 208.

If transaction server 10 has determined that the report has failed (No at S116), transaction server 10 generates third token transaction data (S121).

Next, transaction server 10 transmits the generated third token transaction data to each of the plurality of terminals 20 (S122).

Next, transaction server 10 and the plurality of terminals 20 execute a consensus algorithm, generate a block that includes the third token transaction data, and store the generated block into corresponding distributed ledger 107 or 208 (S123). With this operation, the process of collecting a token in the third token amount from the reporter is executed in transaction server 10. Transaction server 10 may notify terminal 20 of the reporter that a token in the third token amount has been collected from the reporter.

In this example, at step S121, transaction server 10 may further generate first token transaction data. In this case, at step S122, transaction server 10 further transmits the generated first token transaction data to each of the plurality of terminals 20. Then, at step S123, transaction server 10 and the plurality of terminals 20 may further execute a consensus algorithm, generate a block that includes the first token transaction data, and store the generated block into corresponding distributed ledger 107 or 208. With this operation, the process of providing each voter with a token in the first token amount is executed in transaction server 10. Transaction server 10 may notify terminal 20 of each voter that the voter has been provided with a token in the first token amount.

Figure 6:
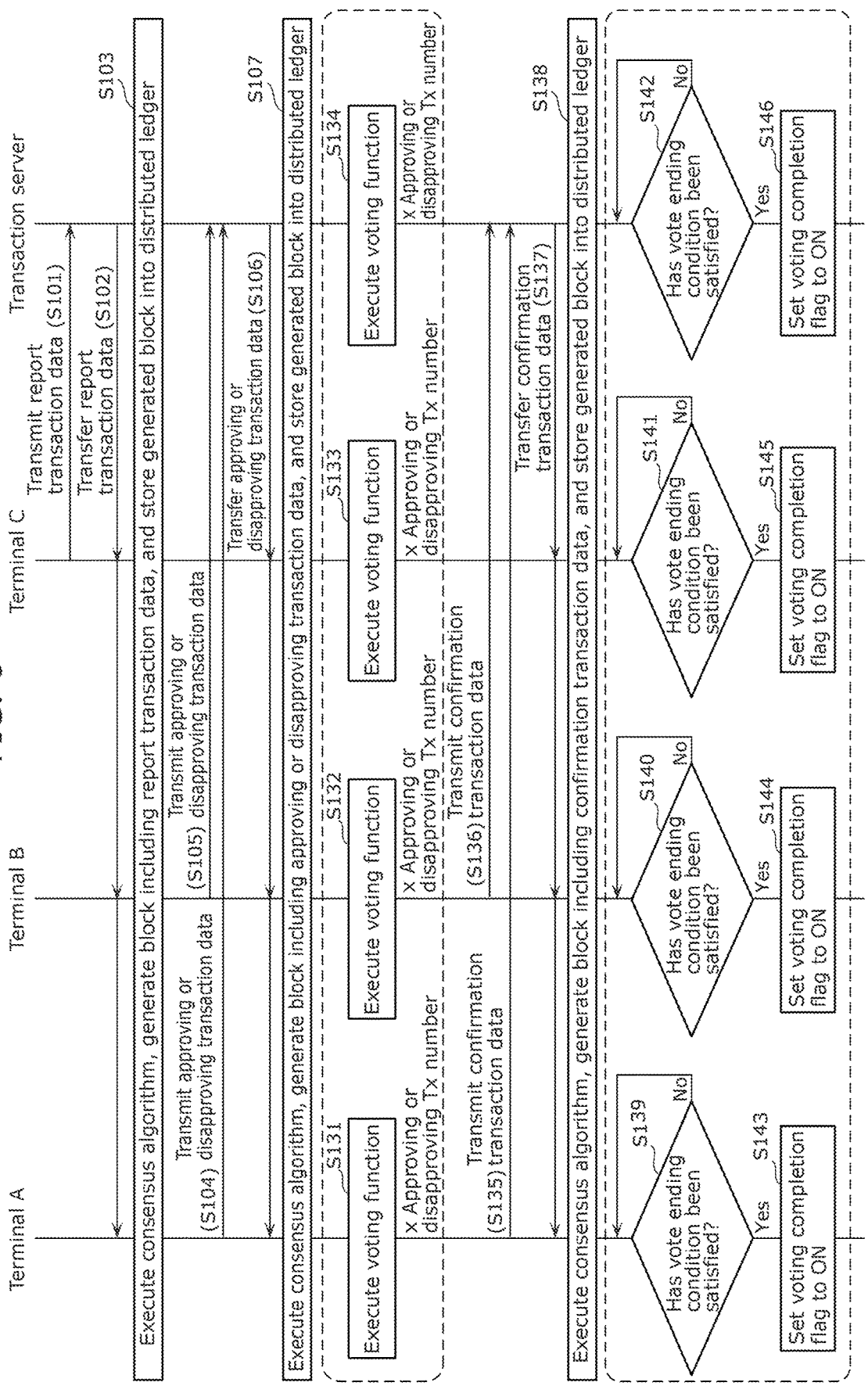
FIG. 6 is a sequence diagram illustrating a second example of an illicit transaction detecting process performed by the managing system according to Embodiment 1.
Figure 7:
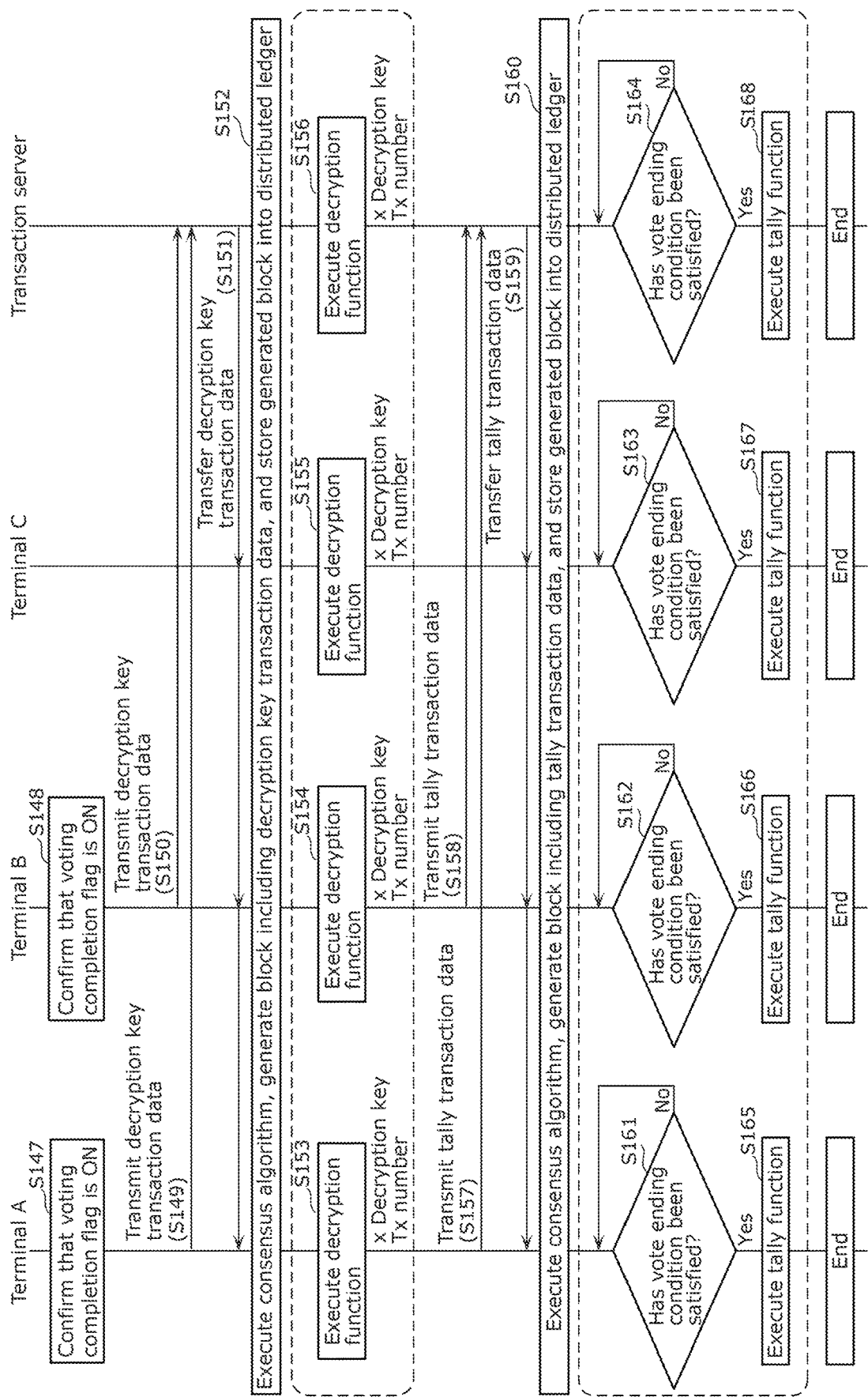
FIG. 7 is a sequence diagram illustrating the second example of the illicit transaction detecting process performed by the managing system according to Embodiment 1.

FIG. 6 and FIG. 7 show a sequence diagram illustrating a second example of an illicit transaction detecting process performed by the managing system according to Embodiment 1. FIG. 7 shows the process continued from the process shown in FIG. 6.

In the second example, each process performed in the first example is executed by a smart contract. In other words, in the second example, a contract code that executes each process performed in the first example is stored in distributed ledger 107 or 208. Such a process includes any one of the process of receiving approving or disapproving information (i.e., the process of voting), the process of making a determination on the vote ending condition, the process of decrypting approving or disapproving information, the process of tallying the voting result, the process of determining whether a report is correct, the process of canceling a transaction, or the process of providing a reporter or a voter with a token or collecting a token from a reporter or a voter. In the example described with reference to FIG. 6 and FIG. 7, all of these processes are executed by a smart contract, but this is not a limiting example. For example, one or more of these processes may be executed by a smart contract, and the remaining processes may be executed by one device among transaction server 10 and the plurality of terminals 20 instead of being executed by a smart contract.

Terminal A, terminal B, and terminal C shown in FIG. 6 and FIG. 7 are the same as those described in the first example. Moreover, user A, user B, and user C are also the same as those described in the first example.

First, the same processes as those at steps S101 to S107 in the first example are performed.

Then, in response to the consensus algorithm having been executed with regard to the approving or disapproving transaction data, transaction server 10 and the plurality of terminals 20 each execute a voting function by a smart contract (S131 to S134). In the second example, approving or disapproving transaction data includes a smart contract address, a voting function serving as an invoked function, approving or disapproving information serving as an argument, and the user ID of each user. The user ID of each user is the user ID of each user owning terminal 20 that has generated the corresponding approving or disapproving transaction data. The voting function is a function for executing the process of voting in favor of or against a report. The process at each of steps S131 to S134 is performed in the number equal to the number of items of approving or disapproving transaction data. In other words, the process at each of steps S131 to S134 is performed in the number equal to the number of votes.

Next, terminal A and terminal B each generate confirmation transaction data and transmit the generated confirmation transaction data to transaction server 10 (S135, S136). Specifically, after step S131, terminal A generates confirmation transaction data that includes a confirmation function for executing a confirmation as to whether the voting has ended and transmits the generated confirmation transaction data to transaction server 10. The confirmation transaction data includes a smart contract address, an end confirming function serving as an invoked function, the current time serving as an argument, and the user ID of each user. The user ID of each user is the user ID of each user owning terminal 20 that has generated the corresponding confirmation transaction data. In other words, the user ID is the user ID of user A when terminal 20 is terminal A. After step S131, terminal A periodically generates confirmation transaction data and transmits the generated confirmation transaction data to transaction server 10. In this example, a similar process is performed in terminal B as well, and thus terminal B also generates confirmation transaction data, and the generated confirmation transaction data is transmitted to transaction server 10.

Next, transaction server 10 transfers the confirmation transaction data received from terminal A and the confirmation transaction data received from terminal B to each of the plurality of terminals 20 including terminal A and terminal B (S137).

Next, transaction server 10 and the plurality of terminals 20 execute a consensus algorithm, generate a block that includes the confirmation transaction data, and store the generated block into corresponding distributed ledger 107 or 208 (S138).

Next, in response to the consensus algorithm having been executed with regard to the confirmation transaction data, transaction server 10 and the plurality of terminals 20 each execute an end confirming function by a smart contract (S139 to S146). The end confirming function is a function for making a determination on the vote ending condition. Specifically, transaction server 10 and the plurality of terminals 20 each determine whether the vote ending condition has been satisfied by executing the end confirming function (S139 to S142). This process is similar to the process at step S108 of the first example, and thus detailed descriptions thereof will be omitted. If transaction server 10 and the plurality of terminals 20 have each determined that the vote ending condition has been satisfied (Yes at S139 to S142), transaction server 10 and the plurality of terminals 20 each set a voting completion flag to ON, that is, change the value of the flag from the value indicating that the voting has not been completed to the value indicating that the voting has been completed (S143 to S146). Specifically, if transaction server 10 and the plurality of terminals 20 have each determined that the vote ending condition has not been satisfied (No at S139 to S142), the flow returns to the processes at steps S139 to S142.

Next, terminal A and terminal B confirm that the voting completion flag is ON (S147, S148).

Next, when the voting completion flag is ON, terminal A and terminal B each generate decryption key transaction data and transmit the generated decryption key transaction data to transaction server 10 (S149, S150). Specifically, after step S147, terminal A generates decryption key transaction data and transmits the generated decryption key transaction data to transaction server 10. In the second example, decryption key transaction data includes a smart contract address, a decryption function serving as an invoked function, a decryption key serving as an argument, and the user ID of each user. The user ID of each user is the user ID of each user owning terminal 20 that has generated the corresponding decryption key transaction data. In other words, the user ID is the user ID of user A when terminal 20 is terminal A. In this example, a similar process is performed in terminal B as well, and thus terminal B also generates decryption key transaction data, and the generated decryption key transaction data is transmitted to transaction server 10.

Next, transaction server 10 transfers the decryption key transaction data received from terminal A and the decryption key transaction data received from terminal B to each of the plurality of terminals 20 including terminal A and terminal B (S151).

Next, transaction server 10 and the plurality of terminals 20 execute a consensus algorithm, generate a block that includes the decryption key transaction data, and store the generated block into corresponding distributed ledger 107 or 208 (S152).

Next, in response to the consensus algorithm having been executed with regard to the decryption key transaction data, transaction server 10 and the plurality of terminals 20 each execute a decryption function by a smart contract (S153 to S156). The decryption function is a function for decrypting the encrypted approving or disapproving information by use of the decryption key. Specifically, by using the decryption key included in the decryption key transaction data obtained from each terminal 20, transaction server 10 and the plurality of terminals 20 each decrypt the encrypted approving or disapproving information included in the approving or disapproving transaction data obtained from each terminal 20. The decryption result is stored, for example, into each storage of transaction server 10 and the plurality of terminals 20. The decryption result may be stored temporarily in the storage. The process at each of steps S153 to S156 is performed in the number equal to the number of items of decryption key transaction data. In other words, the process at each of steps S153 to S156 is performed in the number equal to the number of decryption keys.

Next, terminal A and terminal B each generate tally transaction data and transmits the generated tally transaction data to transaction server 10 (S157, S158). Specifically, after step S153, terminal A generates tally transaction data that includes a tally function for tallying the voting result and transmits the generated tally transaction data to transaction server 10. The tally transaction data includes a smart contract address, a tally function serving as an invoked function, the current time serving as an argument, and the user ID of each user. The user ID of each user is the user ID of each user owning terminal 20 that has generated the corresponding tally transaction data. In other words, the user ID is the user ID of user A when terminal 20 is terminal A. After step S153, terminal A periodically generates tally transaction data and transmits the generated tally transaction data to transaction server 10. In this example, a similar process is performed in terminal B as well, and thus terminal B also generates tally transaction data, and the generated tally transaction data is transmitted to transaction server 10.

Next, transaction server 10 transfers the tally transaction data received from terminal A and the tally transaction data received from terminal B to each of the plurality of terminals 20 including terminal A and terminal B (S159).

Next, transaction server 10 and the plurality of terminals 20 execute a consensus algorithm, generate a block that includes the tally transaction data, and store the generated block into corresponding distributed ledger 107 and or (S160).

Next, in response to the consensus algorithm having been executed with regard to the tally transaction data, transaction server 10 and the plurality of terminals 20 each execute a tally function by a smart contract (S161 to S168). Specifically, transaction server 10 and the plurality of terminals 20 each determine whether the vote ending condition has been satisfied (S161 to S164). If transaction server 10 and the plurality of terminals 20 have each determined that the vote ending condition has been satisfied (Yes at S161 to S164), transaction server 10 and the plurality of terminals 20 each execute the tally function (S165 to S168). The tally function is a function for tallying the voting result. Transaction server 10 and the plurality of terminals 20 each perform a tallying process by executing the tally function. If transaction server 10 and the plurality of terminals 20 have each determined that the vote ending condition has not been satisfied (No at S161 to S164), the flow returns to the processes at steps S161 to S164.

Figure 8:
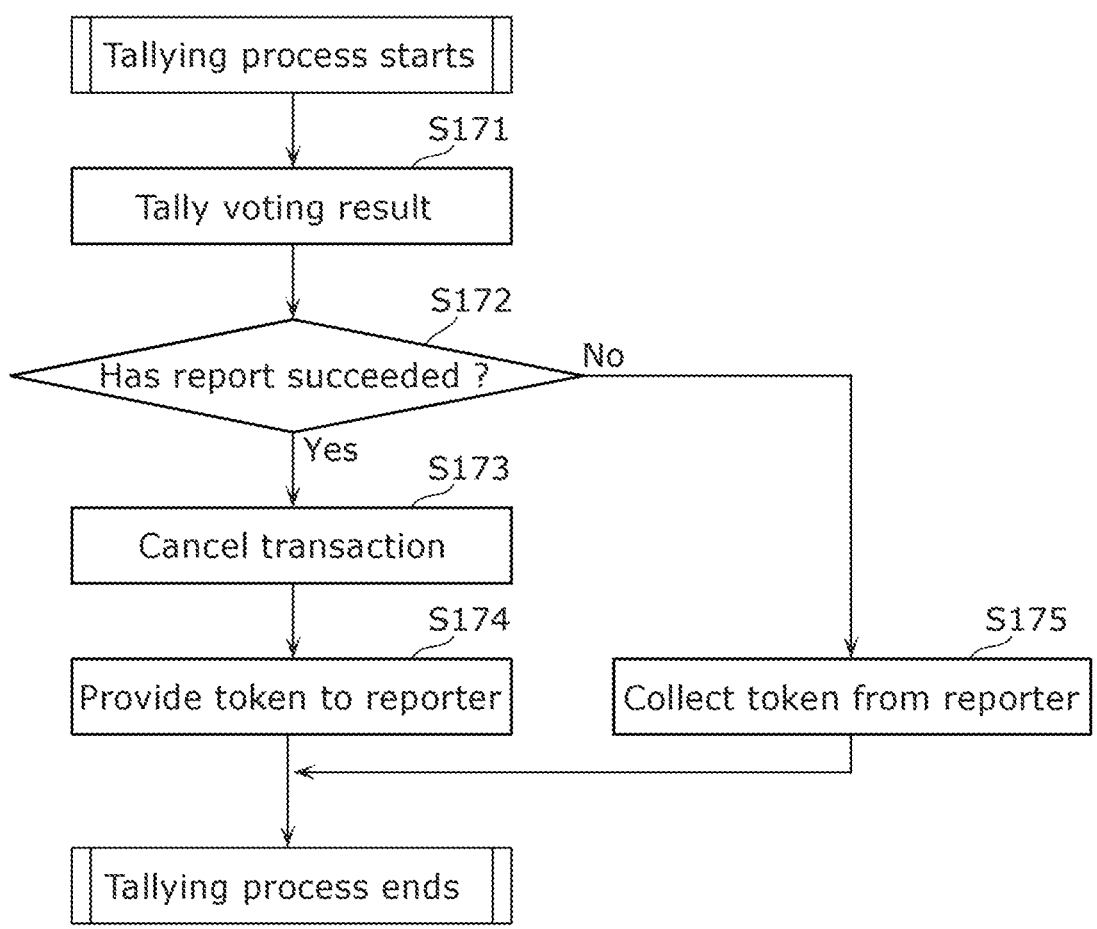
FIG. 8 is a flowchart illustrating an example of a tallying process according to Embodiment 1.

FIG. 8 is a flowchart illustrating an example of a tallying process according to Embodiment 1.

Upon the tallying process being started, transaction server 10 and the plurality of terminals 20 each tally the voting result (S171). Specifically, if the decrypted approving or disapproving information indicates that the user is in favor of the report, transaction server 10 and the plurality of terminals 20 each add one to the count value of approving votes. Meanwhile, for example, if the decrypted approving or disapproving information indicates that the user is against the report, transaction server 10 and the plurality of terminals 20 may each add one to the count value of disapproving votes. Transaction server 10 and the plurality of terminals 20 each iteratively perform the process described above on each of the received plurality of items of approving or disapproving transaction data and thus count the number of approving votes (or the number of disapproving votes). In other words, the number of approving votes is the number of items of approving or disapproving information indicating that the user is in favor of the report, among the plurality of items of approving or disapproving information included in respective items of approving or disapproving transaction data that transaction server 10 has received. In this manner, transaction server 10 and the plurality of terminals 20 each tally the voting result by counting the number of approving votes (or the number of disapproving votes).

Next, transaction server 10 and the plurality of terminals 20 each determine whether the report has succeeded (S172). This determination process is the same as the process at step S116 of the first example, and thus detailed descriptions thereof will be omitted.

If transaction server 10 and the plurality of terminals 20 have each determined that the report has succeeded (Yes at S172), transaction server 10 cancels the reported transaction (S173). This process is the same as the process at step S117 of the first example, and thus detailed descriptions thereof will be omitted.

Next, transaction server 10 and the plurality of terminals 20 each execute the process of providing the reporter with a token in the second token amount (S174). In this example, transaction server 10 and the plurality of terminals 20 may each execute the process of providing each voter with a token in the first token amount.

Meanwhile, if transaction server 10 and the plurality of terminals 20 have each determined that the report has failed (No at S172), transaction server 10 and the plurality of terminals 20 each execute the process of collecting a token from the reporter in the third token amount (S175). In this example, transaction server 10 and the plurality of terminals 20 may each execute the process of providing each voter with a token in the first token amount.

Figure 9:
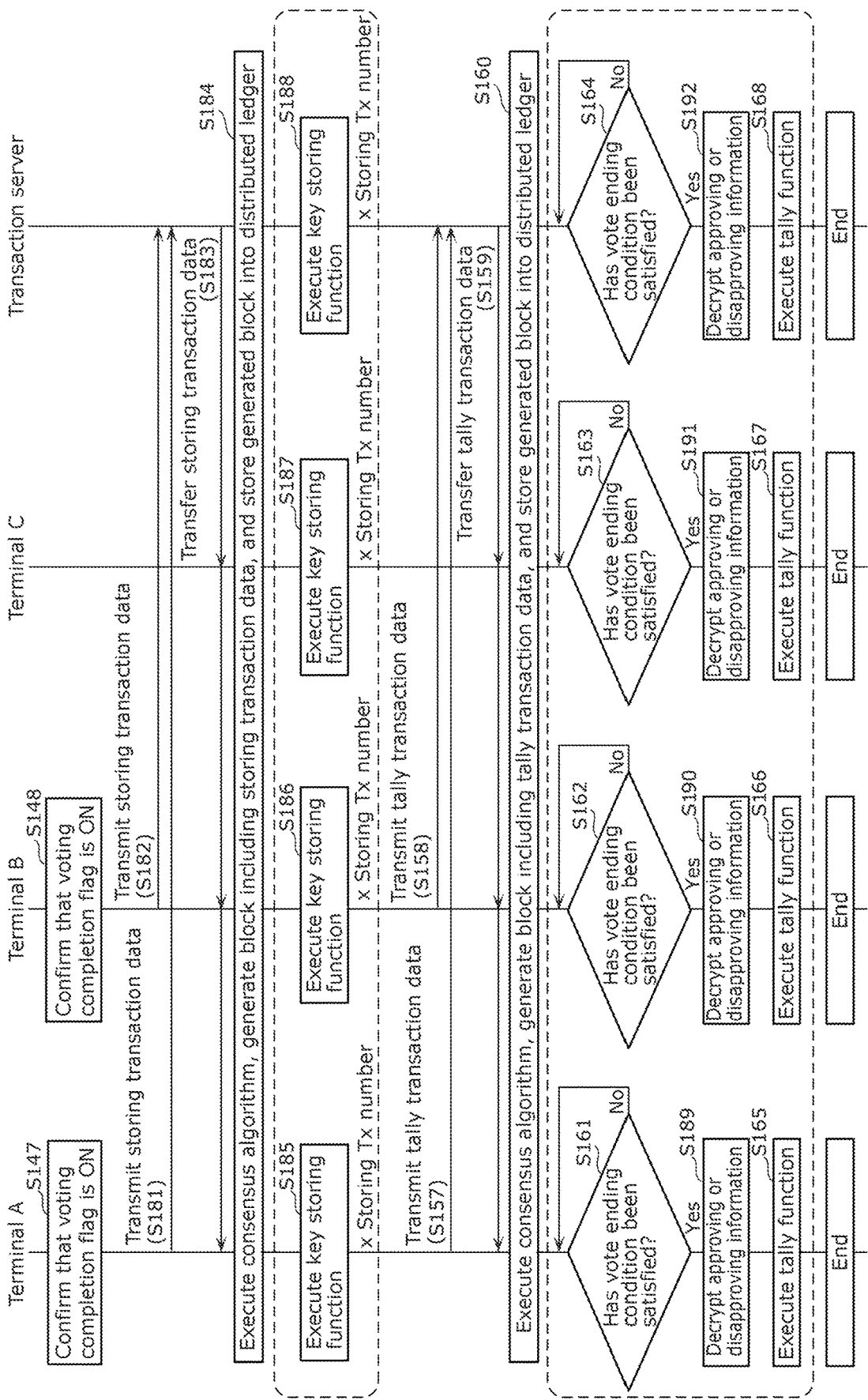
FIG. 9 is a sequence diagram illustrating a third example of an illicit transaction detecting process performed by the managing system according to Embodiment 1.

FIG. 9 is a sequence diagram illustrating a third example of an illicit transaction detecting process performed by the managing system according to Embodiment 1. The processes in the first half in the third example are the same as those in the second example, and thus the processes that differ from the processes in the second example will mainly be described. Specifically, the third example includes the processes described with reference to FIG. 6 in the second example. FIG. 9 shows the process continued from the process shown in FIG. 6.

While the decrypting process and the tallying process are performed separately in the second example, the decrypting process and the tallying process are performed in batch in the third example. The description starts from the process continued from the process shown in FIG. 6.

Step S147 is the same as that in the second example.

Then, when the voting completion flag is ON, terminal A and terminal B each generate storing transaction data and transmit the generated storing transaction data to transaction server 10 (S181, S182). Specifically, after step S147, terminal A generates storing transaction data and transmits the generated storing transaction data to transaction server 10. The storing transaction data includes a smart contract address, a storing function serving as an invoked function, a decryption key serving as an argument, and the user ID of each user. The user ID of each user is the user ID of each user owning terminal 20 that has generated the corresponding storing transaction data. In other words, the user ID is the user ID of user A when terminal 20 is terminal A. In this example, a similar process is performed in terminal B as well, and thus terminal B also generates storing transaction data, and the generated storing transaction data is transmitted to transaction server 10.

Next, transaction server 10 transfers the storing transaction data received from terminal A and the storing transaction data received from terminal B to each of the plurality of terminals 20 including terminal A and terminal B (S183).

Next, transaction server 10 and the plurality of terminals 20 execute a consensus algorithm, generate a block that includes the storing transaction data, and store the generated block into corresponding distributed ledger 107 or 208 (S184).

Next, in response to the consensus algorithm having been executed with regard to the storing transaction data, transaction server 10 and the plurality of terminals 20 each execute a storing function by a smart contract (S185 to S188). The storing function is a function for storing a decryption key into each storage. Specifically, transaction server 10 and the plurality of terminals 20 each store the decryption key included in the storing transaction data obtained from each terminal 20 into each storage of transaction server 10 and the plurality of terminals 20. The process at each of steps S185 to S188 is performed in the number equal to the number of items of storing transaction data. In other words, the process at each of steps S185 to S188 is performed in the number equal to the number of decryption keys.

Next, processes similar to the processes at steps S157 to S160 in the second example are performed.

Next, in response to the consensus algorithm having been executed with regard to the tally transaction data, transaction server 10 and the plurality of terminals 20 each execute a tally function by a smart contract (S161 to S168, S189 to S192). Specifically, transaction server 10 and the plurality of terminals 20 each determine whether the vote ending condition has been satisfied (S161 to S164). If transaction server 10 and the plurality of terminals 20 have each determined that the vote ending condition has been satisfied (Yes at S161 to S164), transaction server 10 and the plurality of terminals 20 each decrypt the approving or disapproving information (S189 to S192). Then, transaction server 10 and the plurality of terminals 20 each execute the tally function (S165 to S168). The tally function is a function for tallying the voting result. Transaction server 10 and the plurality of terminals 20 each perform the tallying process by executing the tally function. If transaction server 10 and the plurality of terminals 20 have each determined that the vote ending condition has not been satisfied (No at S161 to S164), the flow returns to the processes at steps S161 to S164. In this example, the tallying process is the same as the tallying process in the second example, and thus detailed descriptions thereof will be omitted.

Advantageous Effects and Others

As described thus far, the managing system and so on according to Embodiment 1 make it possible to determine whether a report is correct based on approving or disapproving information that is stored in a distributed ledger and is thus unlikely to be altered. This configuration makes it possible to detect an illicit transaction appropriately.

Moreover, with the managing system and so on according to Embodiment 1, with use of a plurality of items of approving or disapproving information, a report is determined to be correct if the number of approving votes is greater than a predetermined threshold value, and a report is determined to be incorrect if the number of approving votes is smaller than the predetermined threshold value. This configuration makes it possible to detect an illicit transaction more appropriately.

Moreover, with the managing system and so on according to Embodiment 1, voters are provided with a token, and this can provide potential voters with an incentive to vote. Therefore, the configuration can increase the number of voters and reduce the likelihood that the determination made on a report is biased. Accordingly, the managing system and so on make it possible to detect an illicit transaction more appropriately.

Moreover, with the managing system and so on according to Embodiment 1, a transaction is canceled if the report is determined to be correct, and this configuration can help prevent an illicit transaction from continuing.

Moreover, with the managing system and so on according to Embodiment 1, a reporter who has made a correct report is provided with a token, and this can provide potential reporters with an incentive to make a correct report. Therefore, the managing system and so on make it possible to detect an illicit transaction more appropriately.

Moreover, with the managing system and so on according to Embodiment 1, a token is collected from a reporter who has made an illicit report, and this can reduce the likelihood that a reporter makes an illicit report. Therefore, the managing system and so on make it possible to detect an illicit transaction more appropriately.

Embodiment 2

Figure 10:
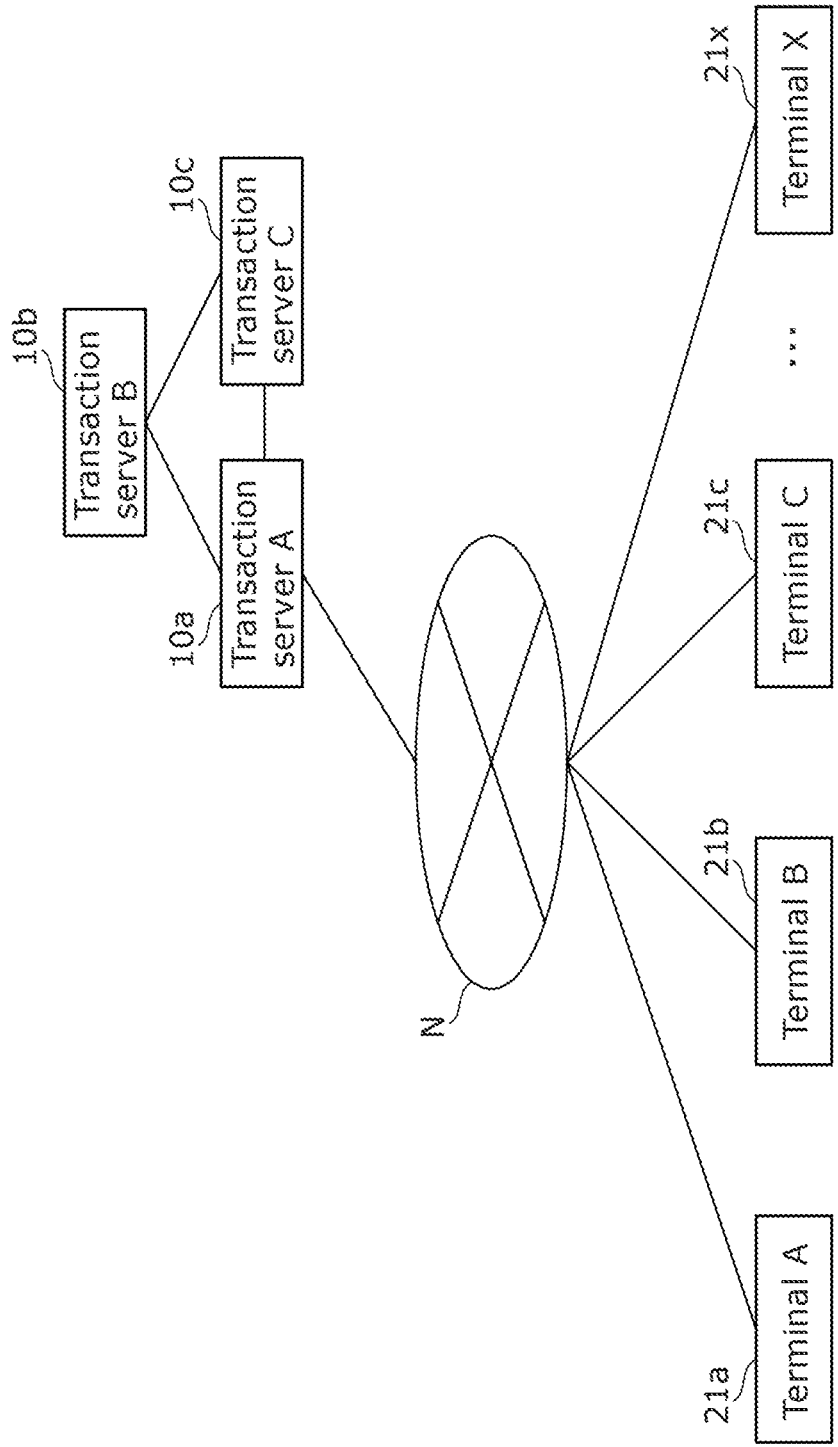
FIG. 10 is a diagram illustrating an example of a configuration of a managing system according to Embodiment 2.

FIG. 10 is a diagram illustrating an example of a configuration of a managing system according to Embodiment 2.

As illustrated in FIG. 10, the managing system according to Embodiment 2 differs from the managing system according to Embodiment 1 in terms of the configuration of terminals 21a to 21x and in that the managing system according to Embodiment 2 includes a plurality of transaction servers 10a to 10c.

In the following description, transaction server 10a to transaction server 10c may each be referred to also as transaction server 10. Alternatively, transaction server 10a to transaction server 10c may be referred to also as transaction server A to transaction server C, respectively. Meanwhile, terminal 21a to terminal 21x may each be referred to also as terminal 21. Alternatively, terminal 21a to terminal 21x may be referred to also as terminal A to terminal X, respectively.

The configuration of transaction server 10 is similar to the configuration according to Embodiment 1, and thus detailed descriptions thereof will be omitted.

[Terminal 21]

Figure 11:
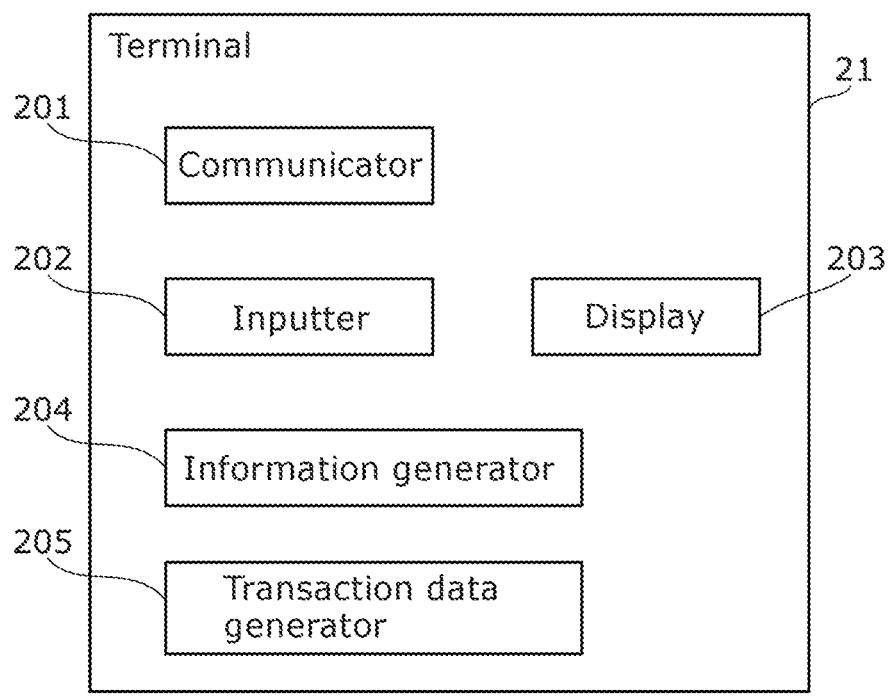
FIG. 11 is a diagram illustrating an example of a configuration of a terminal according to Embodiment 2.

FIG. 11 is a diagram illustrating an example of a configuration of terminal 21 according to Embodiment 2. Elements that are similar to those illustrated in FIG. 3 are given identical reference characters, and detailed descriptions thereof will be omitted.

Terminal 21 illustrated in FIG. 11 differs from terminal 20 according to Embodiment 1 in that terminal 21 does not include transaction data verifier 206, recorder 207, distributed ledger 208, or storage 209. In this example, terminal 21 may have a configuration similar to that of terminal 20.

[Operation and Others of Managing System]

Next, an operation of the managing system configured as described above will be described.

Figure 12:
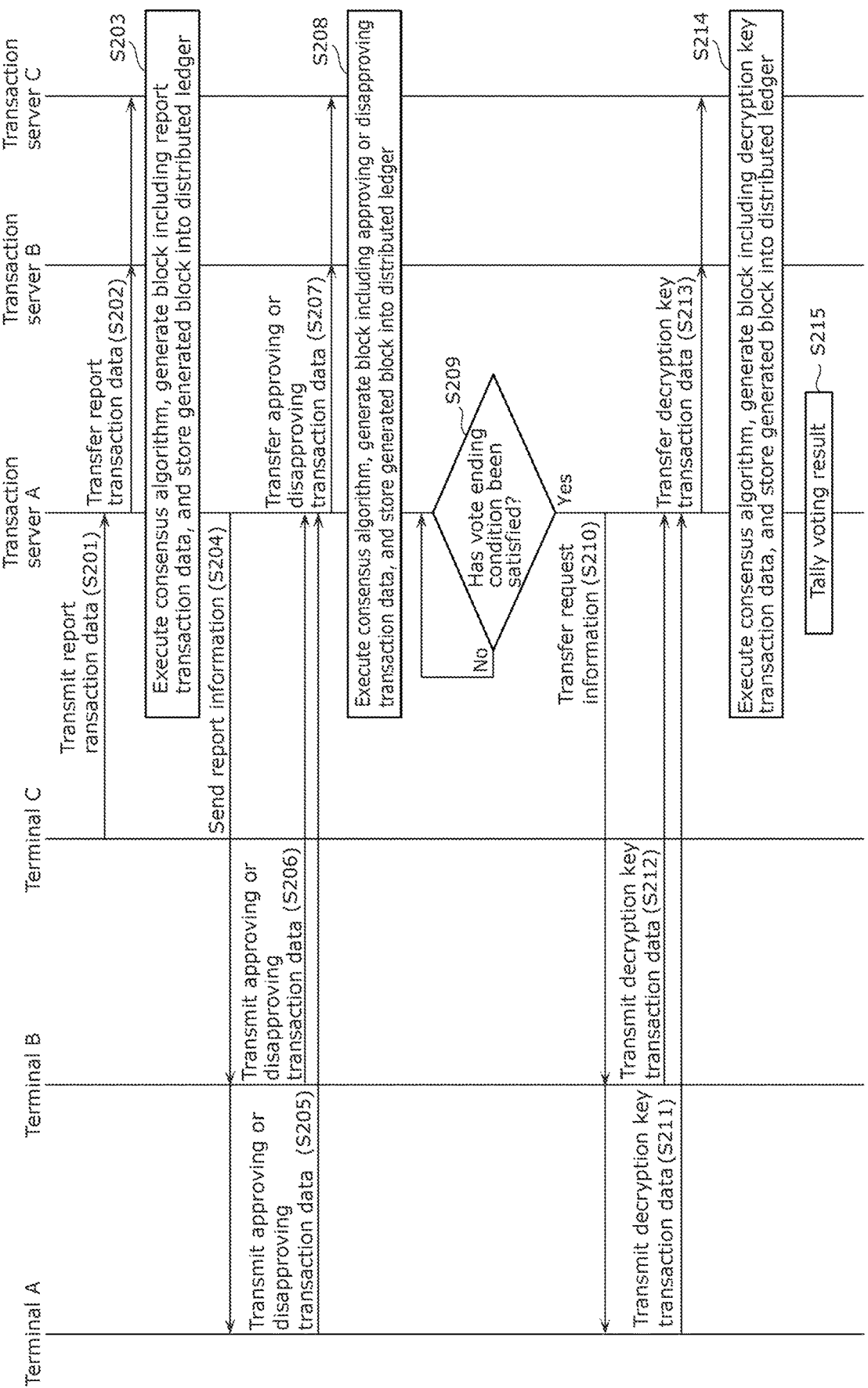
FIG. 12 is a sequence diagram illustrating a first example of an illicit transaction detecting process performed by the managing system according to Embodiment 2.
Figure 13:
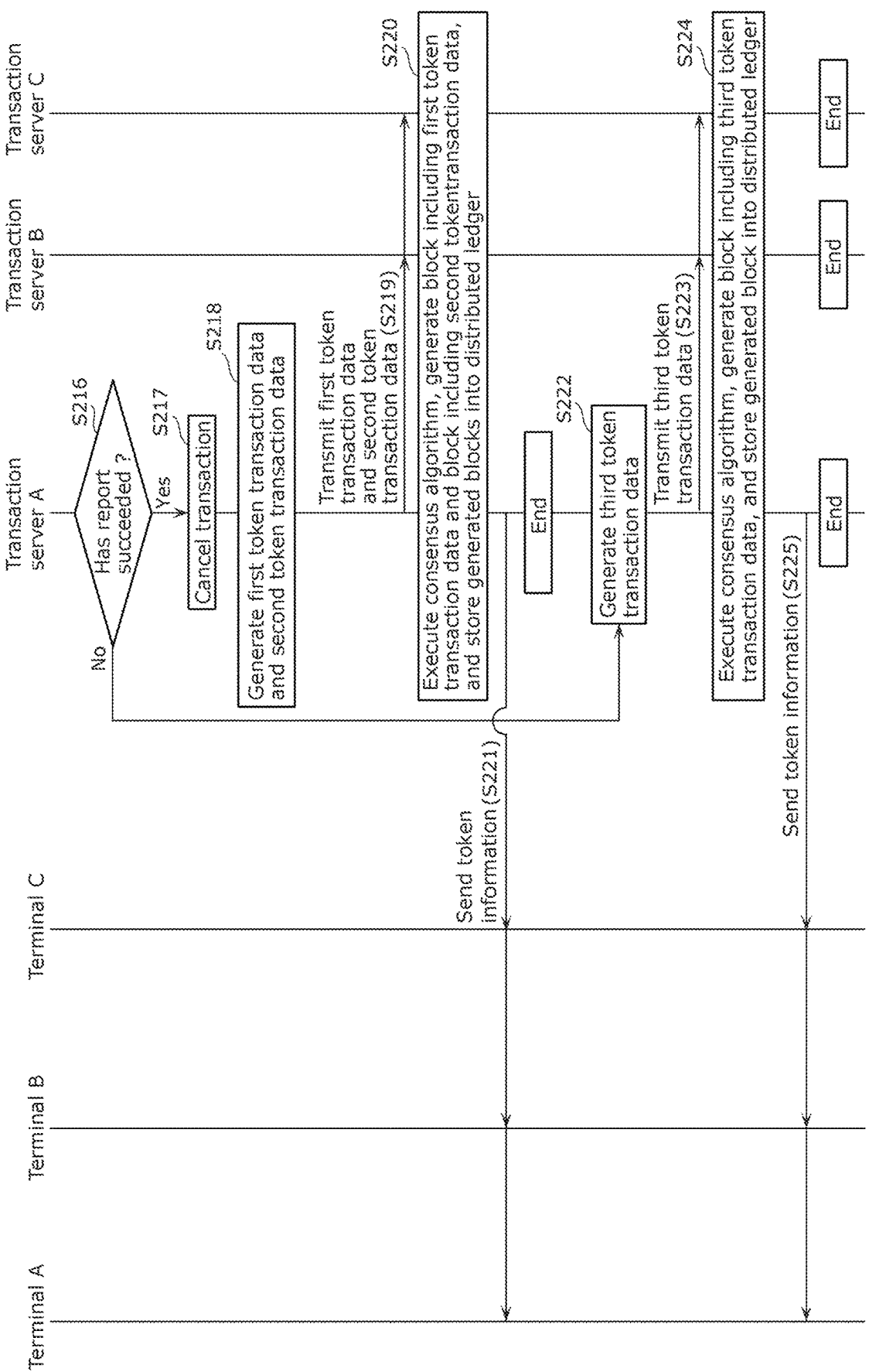
FIG. 13 is a sequence diagram illustrating the first example of the illicit transaction detecting process performed by the managing system according to Embodiment 2.

FIG. 12 and FIG. 13 show a sequence diagram illustrating a first example of an illicit transaction detecting process performed by the managing system according to Embodiment 2. FIG. 13 shows the process continued from the process shown in FIG. 12.

Terminal A, terminal B, and terminal C shown in FIG. 12 and FIG. 13 are terminals 21 operated by, respectively, user A, user B, and user C. In other words, terminal A, terminal B, and terminal C are included in the plurality of terminals 21. Terminal A is a terminal authenticated into an electronic commerce service provided by transaction servers 10a to 10c with use of the user ID of user A. Terminal B is a terminal authenticated into the electronic commerce service provided by transaction servers 10a to 10c with use of the user ID of user B. Terminal C is a terminal authenticated into the electronic commerce service provided by transaction servers 10a to 10c with use of the user ID of user C.

First, by using terminal C, user C of terminal C provides an input indicating that a transaction among a plurality of transactions conducted in the electronic commerce service is suspected of being illicit. In other words, user C is the reporter who has provided the report. Meanwhile, user A and user B are voters who vote to indicate whether they are in favor of or against the report.

Terminal C transmits, to transaction server 10a, report transaction data that includes report information generated based on the input (S201).

Next, transaction server 10a transfers the report transaction data received from terminal C to other transaction server 10b and transaction server 10c (S202).

Next, transaction servers 10a to 10c execute a consensus algorithm, generate a block that includes the report transaction data, and store the generated block into respective distributed ledgers 107 (S203).

Next, transaction server 10a sends the report information included in the report transaction data to terminal A and terminal B (S204).

In this example, transaction server 10a may select all the users other than the reporter as voters, select all the users including the reporter as voters, or select one or more users at random from the plurality of users excluding the reporter. Transaction server 10a transmits the report information to terminals 21 owned by the users selected as voters.

Next, terminal A and terminal B each generate approving or disapproving transaction data and transmit the generated approving or disapproving transaction data to transaction server 10a (S205, S206). Specifically, after step S204, terminal A displays a display (UI) for checking whether user A is in favor of or against the report indicated by the report information and thus prompts user A to provide an input as to whether user A is in favor of or against the report. Then, in response to receiving the input from user A as to whether user A is in favor of or against the report, terminal A generates approving or disapproving information and generates approving or disapproving transaction data that includes the generated approving or disapproving information. In this example, a similar process is performed in terminal B as well, and thus terminal B also generates approving or disapproving transaction data.

Next, transaction server 10a transfers the approving or disapproving transaction data received from terminal A and the approving or disapproving transaction data received from terminal B to other transaction server 10b and transaction server 10c (S207).

Next, transaction servers 10a to 10c execute a consensus algorithm, generate a block that includes the approving or disapproving transaction data, and store the generated block into respective distributed ledgers 107 (S208). In this example, at step S208, transaction server 10a may process the approving or disapproving transaction data received from terminal A and the approving or disapproving transaction data received from terminal B in batch or separately.

Next, transaction server 10a determines whether the vote ending condition has been satisfied (S209). In this example, transaction server 10b and transaction server 10c may also perform the determination at step S209. The determination at step S209 is similar to that at step S108.

If transaction server 10a has determined that the vote ending condition has been satisfied (Yes at S209), transaction server 10a executes the subsequent process at step S210. Meanwhile, if transaction server 10a has determined that the vote ending condition has not been satisfied (No at S209), transaction server 10a waits to receive or transfer the approving or disapproving transaction data from terminal A and terminal B and waits to execute the consensus algorithm.

At step S210, transaction server 10a generates request information and transmits the generated request information to each of the plurality of terminals 21 (S210). The request information is information for requesting a decryption key for decrypting the encrypted approving or disapproving information from each of the plurality of terminals 21 that have transmitted the approving or disapproving transaction data that includes the encrypted approving or disapproving information.

Next, terminal A and terminal B each generate decryption key transaction data and transmit the generated decryption key transaction data to transaction server 10a (S211, S212). Specifically, after step S210, terminal A generates decryption key transaction data that includes a decryption key stored in storage 209 in response to the request information included in the request transaction data. In this example, a similar process is performed in terminal B as well, and thus terminal B also generates decryption key transaction data.

Next, transaction server 10a transfers the decryption key transaction data received from terminal A and the decryption key transaction data received from terminal B to transaction server 10b and transaction server 10c (S213).

Next, transaction servers 10a to 10c execute a consensus algorithm, generate a block that includes the decryption key transaction data, and store the generated block into respective distributed ledgers 107 (S214).

Next, transaction server 10a tallies the voting result by use of the approving or disapproving transaction data and the decryption key transaction data obtained from each of terminal A and terminal B (S215). Specifically, by using the decryption key included in the decryption key transaction data obtained from each terminal 21, transaction server 10a decrypts the encrypted approving or disapproving information included in the approving or disapproving transaction data obtained from corresponding terminal 21. For example, if decrypted approving or disapproving information indicates that the user is in favor of the report, transaction server 10a adds one to the count value of approving votes. Meanwhile, for example, if decrypted approving or disapproving information indicates that the user is against the report, transaction server 10a may add one to the count value of disapproving votes. Transaction server 10a iteratively performs the process described above on each of the received plurality of items of approving or disapproving transaction data and thus counts the number of approving votes (or the number of disapproving votes). In other words, the number of approving votes is the number of items of approving or disapproving information indicating that the user is in favor of the report, among the plurality of items of approving or disapproving information included in the respective items of approving or disapproving transaction data that transaction server 10a has received. In this manner, transaction server 10a tallies the voting result by counting the number of approving votes (or the number of disapproving votes).

Next, transaction server 10a determines whether the report has succeeded (S216). Specifically, transaction server 10a determines that the report has succeeded if the number of approving votes (i.e., the number of items of approving or disapproving information indicating that the user is in favor of the report) is greater than a predetermined threshold value or determines that the report has failed if the number of approving votes is smaller than the predetermined threshold value. That the report has succeeded can be rephrased as that the report is correct, and that the report has failed can be rephrased as that the report is incorrect.

If transaction server 10a has determined that the report has succeeded (Yes at S216), transaction server 10a cancels the reported transaction (S217). Specifically, transaction server 10a may cancel the transaction by setting a flag indicating that the reported transaction has been canceled to ON, that is, by changing the value of the flag from the value indicating that the transaction is ongoing to the value indicating that the transaction has been canceled. Upon the transaction having been canceled, transaction server 10a may provide a display indicating that the corresponding transaction is on hold in the electronic commerce service or may change the status of the transaction to the one where no input can be accepted from the users in the electronic commerce service.

Next, transaction server 10a generates first token transaction data and second token transaction data (S218).

Next, transaction server 10a transmits the generated first token transaction data and the generated second token transaction data to transaction server 10b and transaction server 10c (S219).

Next, transaction servers 10a to 10c execute a consensus algorithm, generate a block that includes the first token transaction data and a block that includes the second token transaction data, and store the generated blocks into respective distributed ledgers 107 (S220). With this operation, in transaction server 10a, the process of providing each voter with a token in the first token amount is executed, and the process of providing the reporter with a token in the second token amount is executed. Transaction server 10a may notify terminal 21 of each voter that the voter has been provided with a token in the first token amount. Moreover, transaction server 10a may notify terminal 21 of the reporter that the reporter has been provided with a token in the second token amount.

In this example, at step S218, transaction server 10a may generate token transaction data that includes the first token amount and the second token amount. At step S219, transaction server 10a may transmit the generated token transaction data to transaction server 10b and transaction server 10c. Then, at step S220, transaction servers 10a to 10c may execute a consensus algorithm, generate a block that includes the token transaction data, and store the generated block into respective distributed ledgers 107.

Next, transaction server 10a notifies the plurality of terminals 21 that the users have each been provided with a token (S221). Specifically, transaction server 10a may notify terminal 21 of each voter that the voter has been provided with a token in the first token amount. Moreover, transaction server 10a may notify terminal 21 of the reporter that the reporter has been provided with a token in the second token amount.

If transaction server 10a has determined that the report has failed (No at S216), transaction server 10a generates third token transaction data (S222).

Next, transaction server 10a transmits the generated third token transaction data to transaction server 10b and transaction server 10c (S223).

Next, transaction servers 10a to 10c execute a consensus algorithm, generate a block that includes the third token transaction data, and store the generated block into respective distributed ledgers 107 (S224). With this operation, the process of collecting a token from the reporter in the third token amount is executed in transaction server 10a.

In this example, at step S222, transaction server 10a may further generate first token transaction data. In this case, transaction server 10a may further transmit the generated first token transaction data to transaction server 10b and transaction server 10c at step S223. Then, at step S224, transaction servers 10a to 10c may further execute a consensus algorithm, generate a block that includes the first token transaction data, and store the generated block into respective distributed ledgers 107. With this operation, the process of providing the voters with tokens in the first token amount is executed in transaction server 10a.

Next, transaction server 10a notifies terminals 21 of the respective voters that the voters have each been provided with a token or that a token has been collected from each of the voters (S225). Specifically, transaction server 10a may notify terminal 21 of each voter that the voter has been provided with a token in the first token amount. Transaction server 10a may notify terminal 21 of the reporter that a token has been collected from the reporter in the third token amount.

The process performed solely by transaction server 10a in the process according to Embodiment 2 may be performed by each of transaction servers 10a to 10c.

Figure 14:
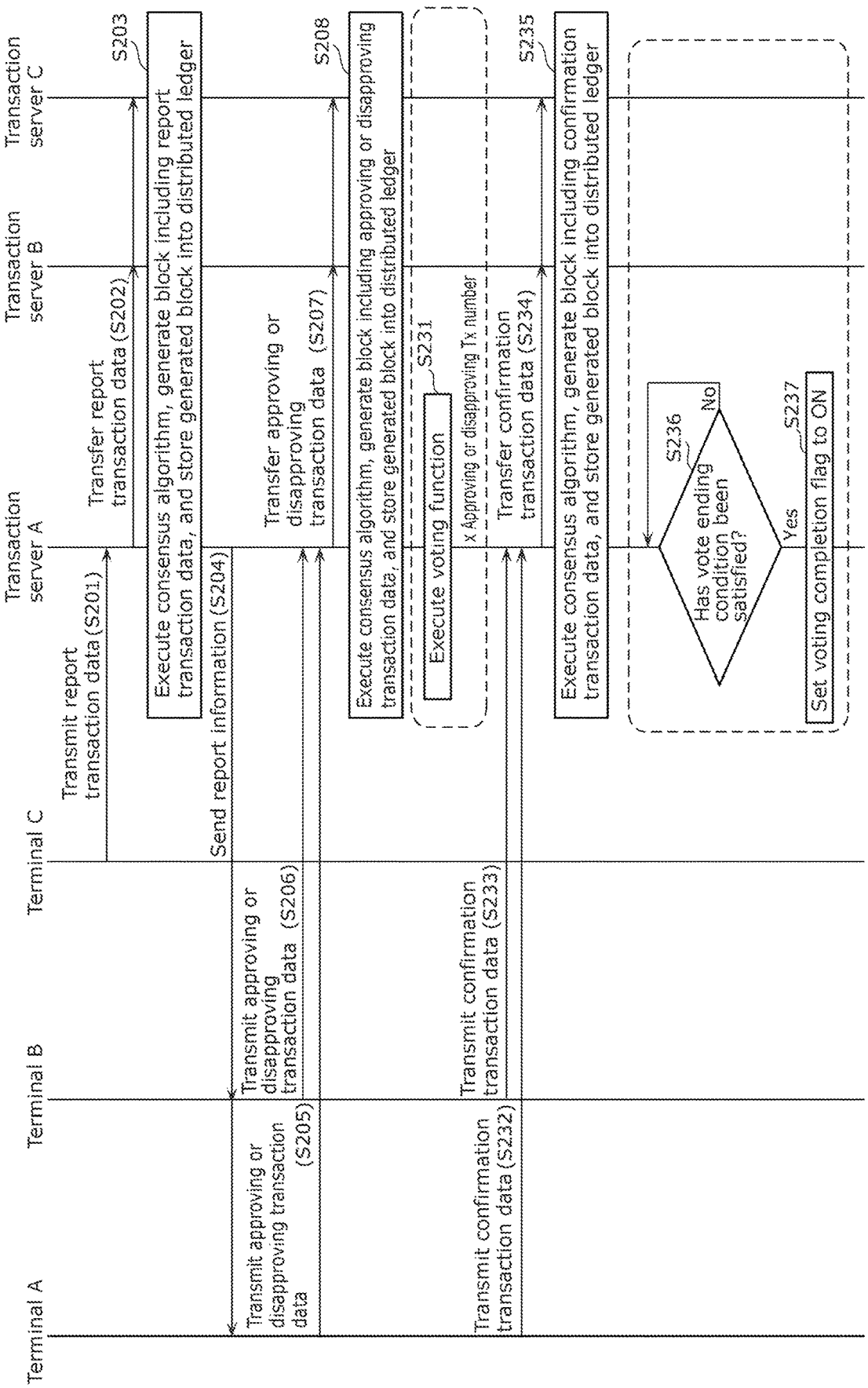
FIG. 14 is a sequence diagram illustrating a second example of an illicit transaction detecting process performed by the managing system according to Embodiment 2.
Figure 15:
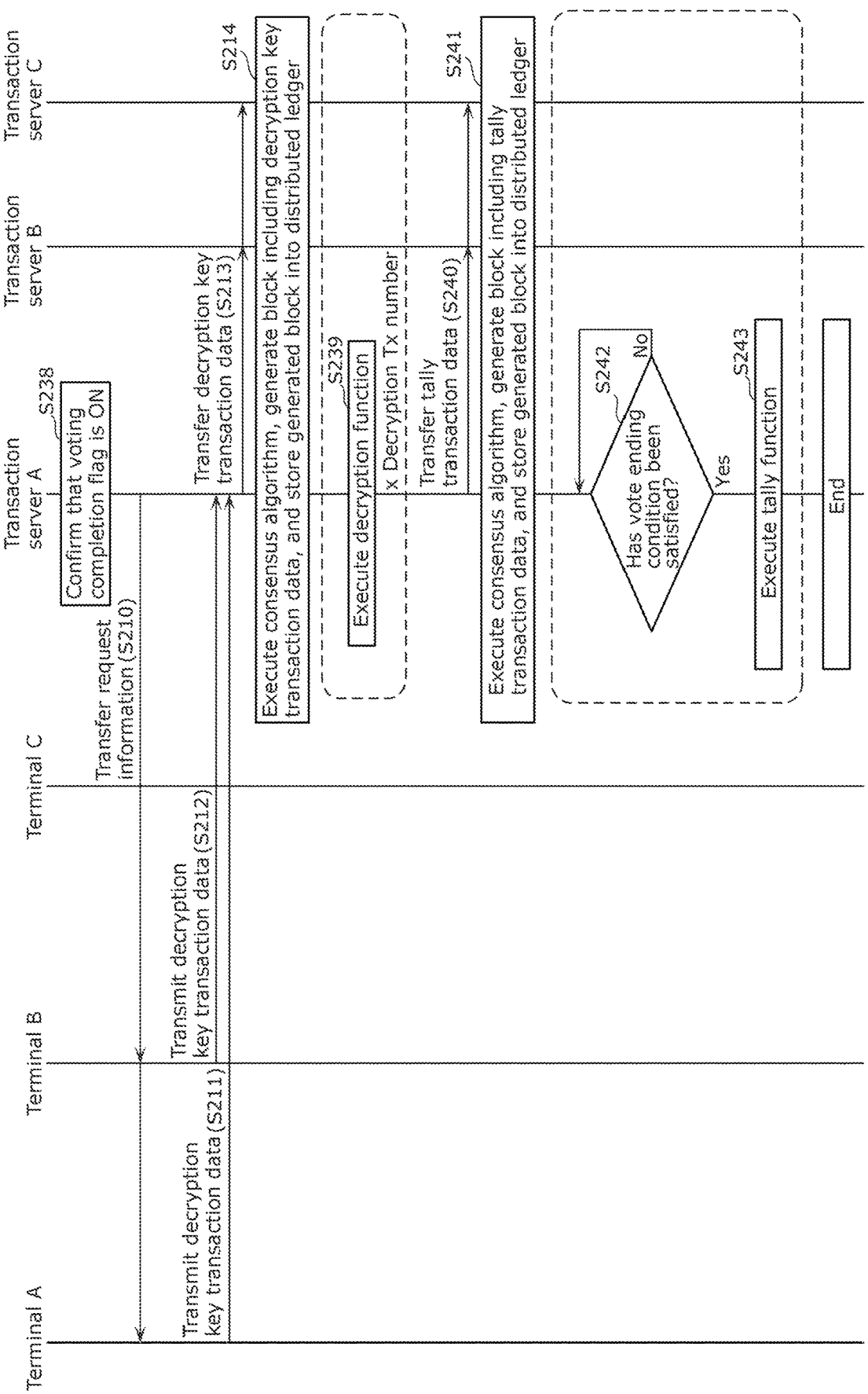
FIG. 15 is a sequence diagram illustrating the second example of the illicit transaction detecting process performed by the managing system according to Embodiment 2.

FIG. 14 and FIG. 15 show a sequence diagram illustrating a second example of an illicit transaction detecting process performed by the managing system according to Embodiment 2. FIG. 15 shows the process continued from the process shown in FIG. 14.

In the second example, each process performed in the first example is executed by a smart contract. In other words, in the second example, a contract code that executes each process performed in the first example is stored in distributed ledger 107. Such a process includes any one of the process of receiving approving or disapproving information (i.e., the process of voting), the process of making a determination on the vote ending condition, the process of decrypting approving or disapproving information, the process of tallying the voting result, the process of determining whether a report is correct, the process of canceling a transaction, or the process of providing a reporter or a voter with a token or collecting a token from a reporter or a voter. In the example described with reference to FIG. 14 and FIG. 15, all of these processes are executed by a smart contract, but this is not a limiting example. For example, one or more of these processes may be executed by a smart contract, and the remaining processes may be executed by one device among transaction servers 10a to 10c instead of being executed by a smart contract.

Terminal A, terminal B, and terminal C shown in FIG. 14 and FIG. 15 are the same as those described in the first example. Moreover, user A, user B, and user C are also the same as those described in the first example.

First, the same processes as those at steps S201 to S208 in the first example are performed.

Then, in response to the consensus algorithm having been executed with regard to the approving or disapproving transaction data, transaction servers 10a to 10c each execute a voting function by a smart contract (S231). In this example, although FIG. 14 shows that only transaction server 10a executes the process at step S231, transaction server 10b and transaction server 10c also execute the process at step S231 in a similar manner. The approving or disapproving transaction data is the same as the approving or disapproving transaction data described in the second example according to Embodiment 1. The process at step S231 is performed in the number equal to the number of items of approving or disapproving transaction data. In other words, the process at step S231 is performed in the number equal to the number of votes.

Next, terminal A and terminal B each generate confirmation transaction data and transmit the generated confirmation transaction data to transaction server 10a (S232, S233). Specifically, after step S205, terminal A generates confirmation transaction data that includes a confirmation function for executing the confirmation as to whether the voting has ended and transmits the generated confirmation transaction data to transaction server 10a. The confirmation transaction data is the same as the confirmation transaction data described according to Embodiment 1. After step S205, terminal A periodically generates confirmation transaction data and transmits the generated confirmation transaction data to transaction server 10a. In this example, a similar process is performed in terminal B as well, and thus terminal B also generates confirmation transaction data, and the generated confirmation transaction data is transmitted to transaction server 10a.

Next, transaction server 10a transfers the confirmation transaction data received from terminal A and the confirmation transaction data received from terminal B to transaction server 10b and transaction server 10c (S234).

Next, transaction servers 10a to 10c execute a consensus algorithm, generate a block that includes the confirmation transaction data, and store the generated block into respective distributed ledgers 107 (S235).

Next, in response to the consensus algorithm having been executed with regard to the confirmation transaction data, transaction servers 10a to 10c each execute an end confirming function by a smart contract (S236). The end confirming function is a function for making a determination on the vote ending condition. Specifically, transaction servers 10a to 10c each determine whether the vote ending condition has been satisfied by executing the end confirming function (S236). This process is similar to the process at step S108 of the first example according to Embodiment 1, and thus detailed descriptions thereof will be omitted. If transaction servers 10a to 10c have each determined that the vote ending condition has been satisfied (Yes at S236), transaction servers 10a to 10c each set a voting completion flag to ON, that is, change the value of the flag from the value indicating that the voting has not been completed to the value indicating that the voting has been completed (S237). Meanwhile, if transaction servers 10a to 10c have each determined that the vote ending condition has not been satisfied (No at 236), the flow returns to the process at step S236. In this example, although FIG. 14 shows that only transaction server 10a executes the process at step S236 and the process at step S237, transaction server 10b and transaction server 10c also execute the process at step S236 and the process at step S237 in a similar manner.

Next, transaction server 10a confirms that the voting completion flag is ON (S238).

Next, when the voting completion flag is ON, transaction server 10a generates request information and transmits the generated request information to each of the plurality of terminals 21 (S210).

Next, processes similar to those at steps S211 to 214 are performed.

Next, in response to the consensus algorithm having been executed with regard to the decryption key transaction data, transaction servers 10a to 10c each execute a decryption function by a smart contract (S239). The decryption function is a function for decrypting the encrypted approving or disapproving information by use of a decryption key. Specifically, by using the decryption key included in the decryption key transaction data obtained from each terminal 21, transaction servers 10a to 10c each decrypt the encrypted approving or disapproving information included in the approving or disapproving transaction data obtained from corresponding terminal 21. The decryption result is stored, for example, into the storage of each of transaction servers 10a to 10c. The decryption result may be stored temporarily in the storage. The process at step S239 is performed in the number equal to the number of items of decryption key transaction data. In other words, the process at step S239 is performed in the number equal to the number of decryption keys. In this example, although FIG. 15 shows that only transaction server 10a executes the process at step S239, transaction server 10b and transaction server 10c also execute the process at step S239 in a similar manner.

Next, transaction server 10a generates tally transaction data and transmits the generated tally transaction data to transaction server 10b and transaction server 10c (S240). Specifically, after step S239, transaction server 10a generates tally transaction data that includes a tally function for tallying the voting result and transmits the generated tally transaction data to transaction server 10b and transaction server 10c. The tally transaction data is the same as the tally transaction data described according to Embodiment 1. After step S239, transaction server 10a periodically generates tally transaction data and transmits the generated tally transaction data to transaction server 10b and transaction server 10c. In this example, a similar process may be performed in transaction server 10b and transaction server 10c as well, and thus transaction server 10b and transaction server 10c may each also generate tally transaction data, and the generated tally transaction data may be transmitted to other transaction servers 10.

Next, transaction servers 10a to 10c execute a consensus algorithm, generate a block that includes the tally transaction data, and store the generated block into respective distributed ledgers 107 (S241).

Next, in response to the consensus algorithm having been executed with regard to the tally transaction data, transaction servers 10a to 10c each execute a tally function by a smart contract (S242, S243). Specifically, transaction servers 10a to 10c each determine whether the vote ending condition has been satisfied (S242). If transaction servers 10a to 10c have each determined that the vote ending condition has been satisfied (Yes at S242), transaction servers 10a to 10c each execute the tally function (S243). The tally function is a function for tallying the voting result. Transaction servers 10a to 10c each perform a tallying process by executing the tally function. If transaction servers 10a to 10c have each determined that the vote ending condition has not been satisfied (No at 242), the flow returns to the process at step S242. In this example, although FIG. 15 shows that only transaction server 10a executes the process at step S242 and the process at step S243, transaction server 10b and transaction server 10c also execute the process at step S242 and the process at step S243 in a similar manner.

The tallying process is the same as the tallying process described according to Embodiment 1 with reference to FIG. 8, and thus detailed descriptions thereof will be omitted.

Figure 16:
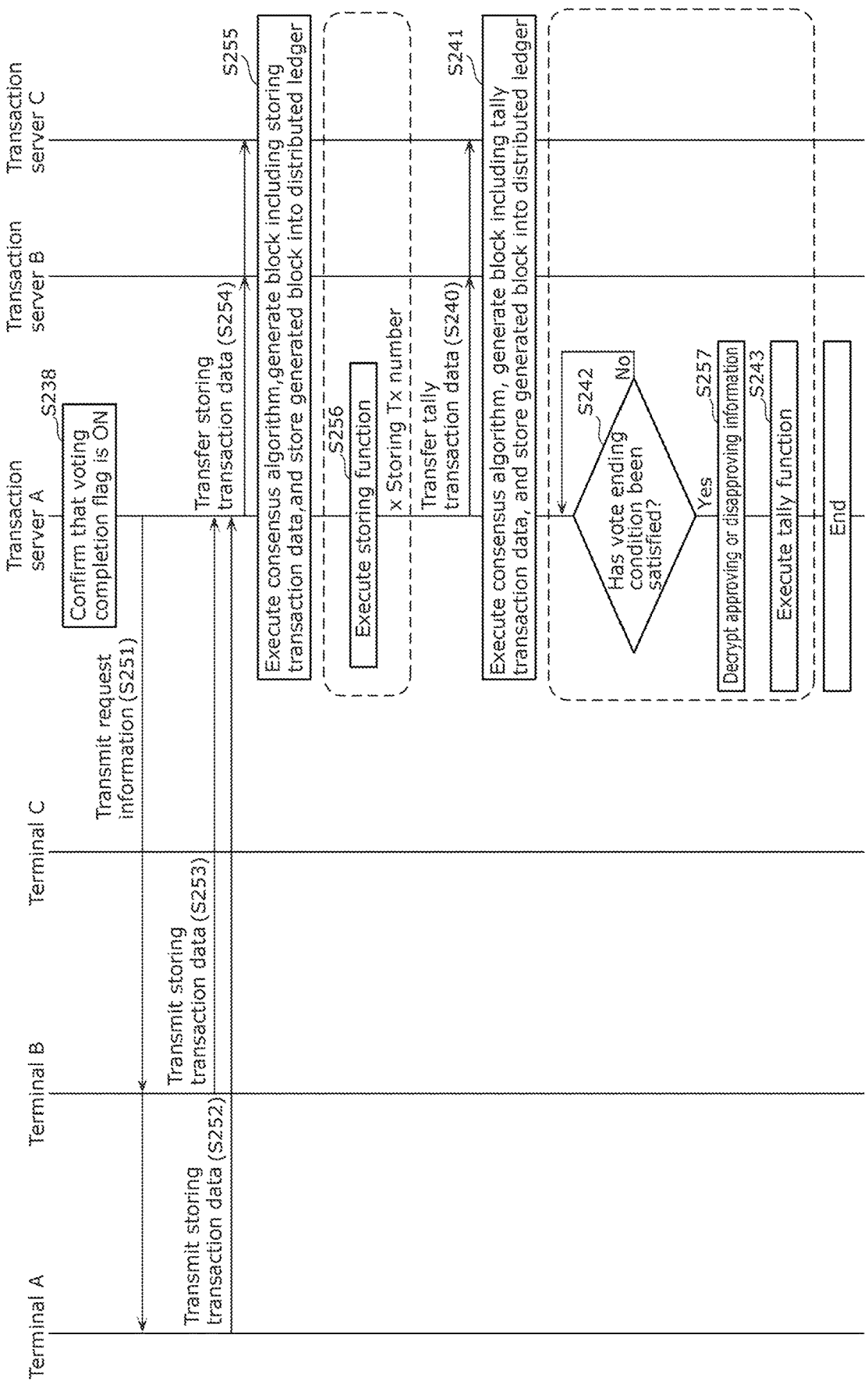
FIG. 16 is a sequence diagram illustrating a third example of an illicit transaction detecting process performed by the managing system according to Embodiment 2.

FIG. 16 is a sequence diagram illustrating a third example of an illicit transaction detecting process performed by the managing system according to Embodiment 2. The processes in the first half in the third example are the same as those in the second example, and thus processes that differ from the processes in the second example will mainly be described. Specifically, the third example includes the processes described with reference to FIG. 14 in the second example. FIG. 16 shows the process continued from the process shown in FIG. 14.

While the decrypting process and the tallying process are performed separately in the second example, the decrypting process and the tallying process are performed in batch in the third example. The description starts from the process continued from the process shown in FIG. 14.

Step S238 is the same as that in the second example.

When the voting completion flag is ON, transaction server 10a generates request information and transmits the generated request information to each of the plurality of terminals 21 (S251). The request information is information for requesting storing transaction data that includes a decryption key for decrypting the encrypted approving or disapproving information from each of the plurality of terminals 21 that have transmitted the approving or disapproving transaction data that includes the encrypted approving or disapproving information.

Next, terminal A and terminal B each generate storing transaction data and transmit the generated storing transaction data to transaction server 10a (S252, S253). The storing transaction data is the same as the storing transaction data described according to Embodiment 1. Specifically, after step S251, terminal A generates storing transaction data that includes a decryption key stored in storage 209 in response to the request information. In this example, a similar process is performed in terminal B as well, and thus terminal B also generates storing transaction data.

Next, transaction server 10a transfers the storing transaction data received from terminal A and the storing transaction data received from terminal B to transaction server 10b and transaction server 10c (S254).

Next, transaction servers 10a to 10c execute a consensus algorithm, generate a block that includes the storing transaction data, and store the generated block into respective distributed ledgers 107 (S255).

Next, in response to the consensus algorithm having been executed with regard to the storing transaction data, transaction servers 10a to 10c each execute a storing function by a smart contract (S256). The storing function is a function for storing a decryption key into each storage. Specifically, transaction servers 10a to 10c each store the decryption key included in the storing transaction data obtained from each terminal 21 into the storage of each of transaction servers 10a to 10c. The process at step S256 is performed in the number equal to the number of items of storing transaction data. In other words, the process at step S256 is performed in the number equal to the number of decryption keys.

Next, processes similar to the processes at step S240 and step S241 in the second example are performed.

Next, in response to the consensus algorithm having been executed with regard to the tally transaction data, transaction servers 10a to 10c each execute a tally function by a smart contract (S242, S243, S257). Specifically, transaction servers 10a to 10c each determine whether the vote ending condition has been satisfied (S242). If transaction servers 10a to 10c have each determined that the vote ending condition has been satisfied (Yes at S242), transaction servers 10a to 10c each decrypt the approving or disapproving information (S257). Then, transaction servers 10a to 10c each execute the tally function (S243). The tally function is a function for tallying the voting result. Transaction servers 10a to 10c each perform a tallying process by executing the tally function. If transaction servers 10a to 10c have each determined that the vote ending condition has not been satisfied (No at 242), the flow returns to the process at step S242. In this example, the tallying process is the same as the tallying process in the second example, and thus detailed descriptions thereof will be omitted.

Advantageous Effects and Others

As described thus far, the managing system and so on according to Embodiment 2 make it possible to determine whether a report is correct based on approving or disapproving information that is stored in a distributed ledger and is thus unlikely to be altered. This configuration makes it possible to detect an illicit transaction appropriately.
Variation 1

In the managing system according to Embodiment 1 or Embodiment 2, transaction server 10 executes a consensus algorithm with regard to transaction data to generate a block that includes the transaction data and stores the generated block into distributed ledger 107 of each transaction server 10, but this is not a limiting example. For example, a plurality of devices excluding transaction server 10 may generate a block that includes transaction data and store the generated block into the distributed ledgers of the respective devices. In this case, transaction server 10 may refer to the data stored in the distributed ledgers of the respective devices by accessing the plurality of devices or obtain necessary information by transmitting a request for the necessary information to each of the plurality of devices. With this configuration, of the processes described to be executed by transaction server 10 in the managing system according to Embodiment 1 or Embodiment 2, transaction server 10 may execute the processes excluding the process of generating a block that includes a transaction and storing the generated block into the distributed ledger.
Variation 2

In the managing system according to Embodiment 1 or Embodiment 2 described above, transaction server 10 provides the reporter with a token or collects a token from the reporter in accordance with whether the report has succeeded. Alternatively, transaction server 10 may raise or lower the reliability of the reporter. For example, if transaction server 10 has determined that a report has succeeded, transaction server 10 may update the reliability of the reporter such that the reliability of the reporter increases, that is, such that the reliability of the reporter rises. Meanwhile, if transaction server 10 has determined that a report has failed, transaction server 10 may update the reliability of the reporter such that the reliability of the reporter decreases. The reliability is an index that indicates whether the user is reliable. For example, this index shows that the greater the value indicating the reliability, the more reliable the user is. Transaction server 10 may generate transaction data that includes the updated reliability and, together with other devices, execute a consensus algorithm with regard to this transaction data. Thus, transaction server 10 may generate a block that includes this transaction data and store the generated block into distributed ledger 107 of transaction server 10.

Moreover, transaction server 10 may change the predetermined threshold value used to determine whether a report has succeeded in accordance with the reliability of the user. For example, transaction server 10 may set the predetermined threshold value to a lower value as the reliability is higher. This configuration makes a report made by a user with a low reliability harder to succeed. For example, a report made by a user who often makes a report even though no illicitness is suspected becomes harder to succeed, and updating the reliability can lower the reliability of such a user. Therefore, this configuration can reduce the likelihood that a transaction that is not suspected of any illicitness is erroneously determined to be an illicit transaction. Conversely, the configuration described above makes a report made by a user with a high reliability easier to succeed. It is highly likely that a user with a high reliability makes a determination of an illicit transaction seriously, and thus an illicit transaction can be detected even in a case where the number of approving votes does not reach the majority. For example, even in a case where the number of approving votes fails to reach the majority because of the organized votes opposing an illicit transaction with a malicious intent, an illicit transaction can be detected.

Moreover, in the electronic commerce service provided by transaction server 10, the number of items that a first user providing an article or a service can list simultaneously may be changed in accordance with the reliability. For example, the number of items that a user can list simultaneously may be set to a smaller value as the reliability of the user is lower. Moreover, the upper limit of the monetary amount by which a second user buying an article or a service can buy one article or one service may be changed in accordance with the reliability. For example, the upper limit of the buying price may be set to a smaller value as the reliability of the user is lower.

Moreover, the weight of a count of one vote that a voter casts with regard to approving or disapproving information may be changed in accordance with the reliability of the voter. For example, the weight of a count of one vote may be set to a smaller value as the reliability of the user is lower. For example, the weight of one vote of a user with a high reliability may be set to 1.5, and such a vote may be counted as 1.5 votes. For example, the weight of one vote of a user with a low reliability may be set to 0.8, and such a vote may be counted as 0.8 votes. In other words, in the determination of whether a report is correct, the number of approving votes is calculated with use of the weight that is based on the reliability.
Variation 3

In the managing system according to Embodiment 1 or Embodiment 2, in the electronic commerce service provided by transaction server 10, a token serving as a deposit for conducting a transaction may be collected in advance from a first user who provides an article or a service. The first user is an applicant who provides an article or a service. Then, the managing system may return the token collected as a deposit to the applicant if no report is made with regard to the transaction conducted by the first user or if a report, if made, is determined to be incorrect. Meanwhile, if a report is made with regard to the transaction conducted by the first user and this report is determined to be correct, the managing system may refrain from returning the token collected as a deposit to the applicant. The token determined not to be returned to the applicant may be provided to the reporter who made the report as a reward. This configuration can reduce the likelihood that an applicant provides an illicit transaction.

Moreover, in the electronic commerce service provided by transaction server 10, a token serving as a deposit for making a report may be collected in advance from a potential reporter. Then, the managing system may return the token collected as a deposit to the reporter if the report made by the reporter has been determined to be correct. Meanwhile, the managing system may refrain from returning the token collected as a deposit to the reporter if the report made by the reporter has been determined to be incorrect. The token determined not to be returned may be provided to the applicant who has provided the transaction, may be provided to the voters, may be provided to a service provider of the electronic commerce service, or may be discarded. This configuration can reduce the likelihood that a reporter makes a report with regard to a transaction that is not suspected of being illicit or a transaction that is unlikely to be illicit.

The amount of a deposit set in this example may be changed in accordance with the reliability described according to Variation 2. For example, the amount of a deposit may be set to a greater value as the reliability of the user is lower.

Variation 4

The method of encrypting approving or disapproving information used in the managing system according to Embodiment 1 or Embodiment 2 may be homomorphic encryption, fully homomorphic encryption, or secret sharing. Data encrypted through homomorphic encryption, fully homomorphic encryption, or secret sharing allows execution of an adding process without the data having been decrypted. For example, when the data indicating an approving vote is set to +1 and the data indicating a disapproving vote is set to −1, the number of approving votes and the number of disapproving votes can be counted while the data remains encrypted. In other words, the votes may be tallied with use of encrypted approving or disapproving information in the tallying process. Thereafter, this encrypted approving or disapproving information may be decrypted. In this case, the tallying process may be performed by transaction server 10 or by a device different from transaction server 10.

Variation 5

In the managing system according to Embodiment 1 or Embodiment 2, a plurality of voters vote in favor of or against a report by inputting whether they are in favor of or against the report by use of their respective terminals, but this is not a limiting example. An information processing device different from a voter may determine whether a report is correct. The information processing device in this case may determine whether a report is correct by use of, for example, a model obtained through machine learning or determine whether a report is correct by use of an algorithm defined in advance. For example, the information processing device may generate a model by performing machine learning with use of a report made with regard to a past transaction, the content of this transaction (the content of the article or the service and its price), and the determination result as to whether this report has been correct. Meanwhile, the algorithm defined in advance may be generated based on the content of an illicit transaction. The content of the illicitness may indicate, for example but not limited to, that the actual article or service in the transaction of interest is different from the article or the service indicated as the subject of the transaction or that the price set for the article or the service in the transaction of interest deviates from its standard price. That the price of an item deviates from its standard price means, for example, that the difference between the set price and the standard price is greater than the value in price corresponding to a predetermined percentage of the standard price. A standard price may be calculated based on an actual record in which an article or a service that is the same as, of the same type as, or equivalent to the article or the service was sold in the past.

In this case, the information processing device alone may transmit the determination result as to whether a report is correct to transaction server 10 as approving or disapproving information. Then, transaction server 10 may determine whether the report is correct based solely on the approving or disapproving information transmitted from the information processing device. In this example, if the report is determined to be correct in the information processing device, the information processing device transmits approving or disapproving information indicating that the user is in favor of the report to transaction server 10. Conversely, if the report is determined to be incorrect in the information processing device, the information processing device transmits approving or disapproving information indicating that the user is against the report to transaction server 10. The approving or disapproving information transmitted at this point may be transmitted as information included in approving or disapproving transaction data. In other words, the information processing device may transmit approving or disapproving transaction data to transaction server 10.

Variation 6

In the managing system according to Embodiment 1 or Embodiment 2, the electronic commerce service is provided by transaction server 10, but the transaction service to be provided is not limited to an electronic commerce service. For example, an operation log of a terminal and/or a detection log of the terminal may be obtained from the terminals owned by the respective users. Then, these logs may be analyzed, and a service of notifying each user of the result of the analysis may be provided. A transaction in this case is a transaction of a log including an operation log and/or a detection log. With regard to reporting, a report that a log is suspected of being illicit may be made, or a report that a user is suspected of being an illicit user may be made.

Variation 7

In the managing system according to Embodiment 1 or Embodiment 2, the process of canceling a transaction may be performed by use of a blockchain system. For example, in the process of canceling a transaction, transaction server 10 may generate transaction canceling transaction data, execute a consensus algorithm with other devices with use of the generated transaction canceling transaction data to generate a block that includes the transaction canceling transaction data, and store the generated block into distributed ledger 107 of transaction server 10 and the distributed ledgers of the respective other devices. The transaction canceling transaction data includes a smart contract address, a transaction canceling function serving as an invoked function, and the report ID serving as an argument. Then, transaction server 10 and the other devices each execute the transaction canceling function to perform the process of canceling the transaction.

Variation 8

In the managing system described as an example according to Embodiment 1 or Embodiment 2, transaction server 10 selects all the users other than the reporter as voters, but this is not a limiting example. Transaction server 10 may select one or more users at random from the plurality of users other than the reporter or select all the users including the reporter as voters. Transaction server 10 transmits approving or disapproving transaction data to terminal 20 owned by each user selected as a voter.

Variation 9

In the managing system according to Embodiment 1 or Embodiment 2, approving or disapproving transaction data may include the hash value of a decryption key or the hash value of plaintext approving or disapproving information.

This configuration makes it possible to determine whether terminal A and terminal B have each transmitted a correct decryption key and whether terminal A and terminal B have each transmitted correct approving or disapproving information.

Variation 10

In the managing system according to Embodiment 1 or Embodiment 2, all the voters are provided with a token in the first token amount, but this is not a limiting example. If a report has succeeded, the voters who have voted in favor of the report may be provided with a token in the first token amount, and a token in a fifth token amount may be collected from the voters who have voted against the report. Meanwhile, if a report has failed, a token in the fifth token amount may be collected from the voters who have voted in favor of the report, and the voters who have voted against the report may be provided with a token in the first token amount.

Variation 11

In Embodiment 1 or Embodiment 2, providing a user with a token may be replaced by raising the reliability of this user, and the user may be provided with a token and at the same time the reliability of this user may be raised. Meanwhile, collecting a token from a user may be replaced by lowering the reliability of the user, and a token may be collected from the user and at the same time the reliability of this user may be lowered.

Other Embodiments, Etc.

Thus far, the present disclosure has been described based on the foregoing exemplary embodiments. It is needless to say, however, that the present disclosure is not limited to the foregoing exemplary embodiments. The cases such as the following are also encompassed by the present disclosure.

(1) Each of the devices according to the foregoing embodiments is specifically a computer system that includes, for example but not limited to, a microprocessor, a read only memory (ROM), a random access memory (RAM), a hard disk unit, a display unit, a keyboard, or a mouse. The RAM or the hard disk unit has a computer program recorded thereon. The microprocessor operates in accordance with the computer program, and thus each of the devices implements its function. In this example, a computer program includes a plurality of sets of command codes providing instructions to a computer to implement a predetermined function.

(2) A part or the whole of the constituent elements included in each of the devices according to the foregoing embodiments may be implemented by a single system large scale integration (LSI) circuit. A system LSI circuit is an ultra-multifunctional LSI circuit manufactured by integrating a plurality of components on a single chip and is specifically a computer system that includes, for example but not limited to, a microprocessor, a ROM, and a RAM. The RAM has a computer program recorded thereon. The microprocessor operates in accordance with the computer program, and thus the system LSI circuit implements its function.

Each unit of the constituent elements forming each of the devices described above may be implemented by a single chip, or a part or the whole of such units may be implemented by a single chip.

Although the term system LSI circuit is used herein, depending on the difference in the degree of integration, such a circuit may also be called an IC, an LSI circuit, a super LSI circuit, or an ultra LSI circuit. The technique for circuit integration is not limited to LSI, and an integrated circuit may be implemented by a dedicated circuit or a general purpose processor. A field programmable gate array (FPGA) that can be programmed after an LSI circuit is manufactured or a reconfigurable processor in which the connection or the setting of the circuit cells within the LSI circuit can be reconfigured may also be used.

Furthermore, when a technique for circuit integration that replaces LSI appears through the advancement in the semiconductor technology or through a derived different technique, the functional blocks may be integrated by use of such different techniques. An application of biotechnology is a possibility.

(3) A part or the whole of the constituent elements forming each of the devices described above may be implemented by an IC card or a single module that can be attached to or detached from each of the devices. The IC card or the module is a computer system that includes, for example but not limited to, a microprocessor, a ROM, and a RAM. The IC card or the module may include the ultra-multifunctional LSI circuit described above. The microprocessor operates in accordance with a computer program, and thus the IC card or the module implements its function. The IC card or the module may be tamper resistant.

(4) The present disclosure may be implemented as methods described above. Moreover, the present disclosure may be implemented in the form of a computer program that implements the methods described above by a computer or in the form of digital signals composed of the computer program described above.

The present disclosure can be implemented in the form of a computer readable recording medium having the computer program or the digital signals recorded thereon, and examples of such a computer readable recording medium include a flexible disk, a hard disk, a CD-ROM, an MO, a DVD, a DVD-ROM, a DVD-RAM, a Blue-ray (BD) (registered trademark) disc, and a semiconductor memory. Moreover, the present disclosure may be the digital signals recorded on any of the aforementioned recording media.

According to the present disclosure, the computer program or the digital signals may be transmitted via an electric communication circuit, a wireless or wired communication circuit, a network represented by the Internet, data broadcast, or the like.

The present disclosure may provide a computer system that includes a microprocessor and a memory. The memory may have the computer program described above recorded thereon, and the microprocessor may operate in accordance with the computer program.

Alternatively, the program or the digital signals may be recorded on a recording medium, and this recording medium may then be transported, or the program or the digital signals may be transported via a network or the like. Thus, the program or the digital signals may be executed by a separate stand-alone computer system.

(5) The foregoing embodiments and variations may be combined with each other.

INDUSTRIAL APPLICABILITY

The present disclosure can be used in a controlling method, a server, and a recording medium and can be used, for example, in a controlling method, a server, and a recording medium that each make it possible to detect an illicit transaction appropriately in transactions.

The invention claimed is:

1. A controlling method to be executed by one device among a plurality of devices each including a distributed ledger in an illicit transaction reporting system that reports an illicit transaction in electronic transactions, the controlling method comprising:
- obtaining, by a communicator of the one device, from a first device of the plurality of devices, report transaction data that includes report information indicating a report that one transaction is suspected of being illicit and content of an illicitness of the one transaction, the report information including user identification information that identifies a first user that made the report, the report transaction data being generated by the first device based on a first input by the first user to the first device;
- transferring, by the communicator, the report transaction data obtained to a plurality of other devices among the plurality of devices and storing, by a recorder of the one device, the report transaction data into the distributed ledger of the one device;
- obtaining, by the communicator, from one or more second devices of the plurality of devices, approving or disapproving transaction data that includes approving or disapproving information indicating whether one or more second users of the one or more second devices are in favor of or oppose the report, the approving or disapproving transaction data being generated by one or more transaction data generators of the one or more second devices based on one or more second inputs by the one or more second users;
- transferring, by the communicator, the approving or disapproving transaction data obtained to each of the plurality of other devices;
- storing, by the recorder, the approving or disapproving transaction data into the distributed ledger of the one device;
- determining, by a determiner of the one device, that a vote ending condition has been satisfied;
- generating, by an information generator of the one device, a request information based on the vote ending condition being satisfied, wherein the request information includes information for requesting a decryption key for decrypting the approving or disapproving transaction data;
- transmitting, by the communicator, the request information to the one or more second devices;
- receiving, by the communicator, from the one or more second devices, a decryption key transaction data that includes the decryption key;
- decrypting, by a transaction data verifier of the one device, the approving or disapproving transaction data through execution of a decryption function for a total number of items of the decryption key transaction data, the decryption function being a function for decrypting the approving or disapproving information included in the approving or disapproving transaction data encrypted; and
- determining, by the determiner, whether the report is correct based on the approving or disapproving information included in the decrypted approving or disapproving transaction data.

2. The controlling method according to claim 1, wherein the obtaining of the approving or disapproving transaction data includes obtaining the items of approving or disapproving transaction data from a plurality of terminals owned respectively by a plurality of users, and the determining includes determining, based on the items of approving or disapproving information, that the report is correct when, of the items of approving or disapproving information, a total number of items of approving or disapproving information that is in favor of the report is greater than a predetermined threshold value or that the report is incorrect when the total number of the items of approving or disapproving information that is in favor of the report is smaller than the predetermined threshold value.

3. The controlling method according to claim 2, further comprising:
- transmitting first token transaction data to the plurality of other devices and storing the first token transaction data into the distributed ledger of the one device, the first token transaction data including a first token amount of a token to be provided to each of the plurality of users who have transmitted the items of approving or disapproving transaction data.

4. The controlling method according to claim 2, further comprising:
- updating a first reliability of each of the plurality of users who have transmitted the items of approving or disapproving transaction data so as to raise the first reliability, transferring first reliability transaction data that includes the first reliability updated to the plurality of other devices, and storing the first reliability transaction data into the distributed ledger of the one device, wherein
- the determining includes calculating the total number of the approving or disapproving information that is in favor of the report by use of a weight that is based on the first reliability.

5. The controlling method according to claim 1, further comprising:
- canceling the one transaction when the report is determined to be correct in the determining.

6. The controlling method according to claim 1, further comprising:
- when the report is determined to be correct in the determining, transmitting second token transaction data to the plurality of other devices and storing the second token transaction data into the distributed ledger of the one device, the second token transaction data including a second token amount of a token to be provided to a reporter that is a user who has transmitted the report transaction data.

7. The controlling method according to claim 1, further comprising:
- when the report is determined to be incorrect in the determining, transmitting third token transaction data to the plurality of other devices and storing the third token transaction data into the distributed ledger of the one device, the third token transaction data including a third token amount of a token to be collected from a reporter that is a user who has transmitted the report transaction data.

8. The controlling method according to claim 1, further comprising:
- when the report is determined to be correct in the determining, updating a reliability of a reporter that is a user who has transmitted the report transaction data so as to raise the reliability, transferring reliability transaction data that includes the reliability updated to the plurality of other devices, and storing the reliability transaction data into the distributed ledger of the one device, wherein the predetermined threshold value used in the determining is set to a smaller value as the reliability updated of the reporter in the distributed ledger stored in the distributed ledger is greater.

9. The controlling method according to claim 1, further comprising:
obtaining application information that includes a fourth token amount for conducting a transaction from a terminal operated by an applicant of the transaction;
returning a token in an amount equal to the fourth token amount to the applicant when no report is made with regard to the transaction or when the report made is determined to be incorrect; and
refraining from returning a token in an amount equal to the fourth token amount to the applicant when the report is made with regard to the transaction and the report is determined to be correct.

10. The controlling method according to claim 9, wherein the fourth token amount is set to an amount corresponding to a reliability set for the applicant.

11. The controlling method according to claim 1, further comprising:
obtaining execution transaction data that includes execution information for causing the determining to be executed, wherein
each of the distributed ledgers included in the plurality of devices includes a contract code for executing the determining based on the execution transaction data, and
the determining includes, in response to obtaining the execution transaction data, executing the determining by executing the contract code included in the distributed ledger of the one device.

12. The controlling method according to claim 1, wherein
the approving or disapproving information included in the approving or disapproving transaction data is encrypted,
the approving or disapproving information encrypted is decrypted with the decryption key, and
whether the report is correct is determined based on the approving or disapproving information decrypted.

13. The controlling method according to claim 12, wherein
the transmitting of the request information includes transmitting request transaction data that includes the request information to the plurality of other devices and storing the request transaction data into the distributed ledger of the one device, and
the obtaining of the decryption key includes obtaining decryption key transaction data that includes the decryption key from the plurality of other devices and storing the decryption key transaction data into the distributed ledger of the one device.

14. The controlling method according to claim 1, wherein the distributed ledger is stored at one or more servers.

15. The controlling method according to claim 1, wherein
the approving or disapproving information is encrypted through at least one of homomorphic encryption, fully homomorphic encryption, secret sharing, or a private key held by a device of the one or more devices that has transmitted the approving or disapproving transaction data, and
the approving or disapproving transaction data including the approving or disapproving information encrypted is transferred to the plurality of other devices via a network.

16. The controlling method according to claim 15, wherein
the approving or disapproving information is encrypted through any one of the homomorphic encryption, the fully homomorphic encryption, or the secret sharing, and tallying is performed using the approving or disapproving information encrypted.

17. The controlling method according to claim 1, wherein:
the approving or disapproving transaction data and the decryption key transaction data each include an electronic signature of one corresponding second user of the one or more second users, and
the electronic signature is generated by the second device based on an input of the one corresponding second user to the second device.

18. A device among a plurality of devices each including a distributed ledger in an illicit transaction reporting system that reports an illicit transaction in electronic transactions, the device comprising:
a communicator;
a determiner;
an information generator;
a transaction data verifier;
a processor; and
a memory, wherein
with use of the memory, the processor executes one or more instructions to cause:
obtaining, by the communicator, from a first device of the plurality of devices, report transaction data that includes report information indicating a report that a transaction is suspected of being illicit and content of an illicitness of the one transaction, the report information including user identification information that identifies a first user that made the report, the report transaction data being generated by the first device based on a first input by the first user to the first device;
transferring, by the communicator, the report transaction data obtained to each of a plurality of other devices among the plurality of devices and storing, by a recorder of the one device, the report transaction data into the distributed ledger of the one device;
obtaining, by the communicator, from the one or more devices, approving or disapproving transaction data that includes approving or disapproving information indicating whether one or more second users of the one or more second devices are in favor of or oppose the report, the approving or disapproving transaction data being generated by one or more transaction data generators of the one or more second device based on one or more second inputs by the one or more second users;
transferring, by the communicator, the approving or disapproving transaction data obtained to each of the plurality of other devices and storing, by the recorder, the approving or disapproving transaction data into the distributed ledger of the one device;
determining, by the determiner, that a vote ending condition has been satisfied;
generating, by the information generator, a request information based on the vote ending condition being satisfied, wherein the request information includes information for requesting a decryption key for decrypting the approving or disapproving transaction data;
transmitting, by the communicator, the request information to the one or more second devices;

receiving, by the communicator, from the one or more second devices, a decryption key transaction data that includes the decryption key;

decrypting, by the transaction data verifier, the approving or disapproving transaction data through execution of a decryption function for a total number of items of the decryption key transaction data, the decryption function being a function for decrypting the approving or disapproving information included in the approving or disapproving transaction data encrypted; and determining, by the determiner, whether the report is correct based on the decrypted approving or disapproving information included in the approving or disapproving transaction data.

19. A non-transitory computer readable recording medium storing a program that, when executed by a processor, causes a computer to execute a controlling method to be executed by one device among a plurality of devices each including a distributed ledger in an illicit transaction reporting system that reports an illicit transaction in electronic transactions, the controlling method comprising:

obtaining, by a communicator of the one device, from a first device of the plurality of devices, report transaction data that includes report information indicating a report that one transaction is suspected of being illicit and content of an illicitness of the one transaction, the report information including user identification information that identifies a first user that made the report, the report transaction data being generated by the first device based on a first input by the first user to the first device;

transferring, by the communicator, the report transaction data obtained to a plurality of other devices among the plurality of devices and storing, by a recorder of the one device, the report transaction data into the distributed ledger of the one device;

obtaining, by the communicator, from one or more second devices of the plurality of devices, approving or disapproving transaction data that includes approving or disapproving information indicating whether one or more second users of the one or more second devices are in favor of or oppose the report, the approving or disapproving transaction data being generated by one or more transaction data generators of the one or more second devices based on one or more second inputs by the one or more second users;

transferring, by the communicator, the approving or disapproving transaction data obtained to each of the plurality of other devices and storing, by the recorder, the approving or disapproving transaction data into the distributed ledger of the one device;

determining, by a determiner of the one device, that a vote ending condition has been satisfied;

generating, by an information generator of the one device, a request information based on the vote ending condition being satisfied, wherein the request information includes information for requesting a decryption key for decrypting the approving or disapproving transaction data;

transmitting, by the communicator, the request information to the one or more second devices;

receiving, by the communicator, from the one or more second devices, a decryption key transaction data that includes the decryption key;

decrypting, by a transaction data verifier of the one device, the approving or disapproving transaction data through execution of a decryption function for a total number of items of the decryption key transaction data, the decryption function being a function for decrypting the approving or disapproving information included in the approving or disapproving transaction data encrypted; and determining, by the determiner, whether the report is correct based on the approving or disapproving information included in the decrypted approving or disapproving transaction data.

* * * * *